United States Patent
Makeev et al.

(10) Patent No.: US 11,089,316 B2
(45) Date of Patent: Aug. 10, 2021

(54) METHOD AND APPARATUS FOR DECODING A RECEIVED SET OF ENCODED DATA

(71) Applicant: V-NOVA INTERNATIONAL LIMITED, London (GB)

(72) Inventors: Ivan Makeev, London (GB); Balázs Keszthelyi, London (GB); Stergios Poularakis, London (GB); Michele Sanna, London (GB); Robert Ettinger, London (GB)

(73) Assignee: V-NOVA INTERNATIONAL LIMITED, London (GB)

( * ) Notice: Subject to any disclaimer, the term of this patent is extended or adjusted under 35 U.S.C. 154(b) by 0 days.

(21) Appl. No.: 16/770,229

(22) PCT Filed: Dec. 6, 2018

(86) PCT No.: PCT/GB2018/053554
§ 371 (c)(1),
(2) Date: Jun. 5, 2020

(87) PCT Pub. No.: WO2019/111012
PCT Pub. Date: Jun. 13, 2019

(65) Prior Publication Data
US 2020/0389660 A1    Dec. 10, 2020

(30) Foreign Application Priority Data

Dec. 6, 2017 (EP) ...................................... 17386046
Feb. 8, 2018 (EP) ...................................... 18386002
(Continued)

(51) Int. Cl.
*H04N 19/436* (2014.01)
*H04N 19/119* (2014.01)
(Continued)

(52) U.S. Cl.
CPC ......... *H04N 19/436* (2014.11); *H04N 19/119* (2014.11); *H04N 19/129* (2014.11);
(Continued)

(58) Field of Classification Search
None
See application file for complete search history.

(56) References Cited

U.S. PATENT DOCUMENTS

| | | | | |
|---|---|---|---|---|
| 2011/0274162 | A1* | 11/2011 | Zhou | H04N 19/117 375/240.03 |
| 2013/0027230 | A1* | 1/2013 | Marpe | H04N 19/436 341/107 |
| 2014/0092965 | A1* | 4/2014 | Joshi | H04N 19/96 375/240.12 |

FOREIGN PATENT DOCUMENTS

WO   WO-2012126037 A1 *   9/2012 ............. H04N 19/42

OTHER PUBLICATIONS

Yang et al., "An overview of lossless digital image compression techniques", Circuits and Systems, 2005. 48th Midwest Symposium on Cinicinnati, Ohio Aug. 7-10, 2005, Piscataway, US, Aug. 7, 2005 (Aug. 7, 2005), pp. 1099-1102. (Year: 2005).*

(Continued)

*Primary Examiner* — Joon Kwon
(74) *Attorney, Agent, or Firm* — Workman Nydegger

(57) ABSTRACT

A method of decoding a received set of encoded data is provided. The set of encoded data represents information that comprises a plurality of data elements having values within a range of values and that has been compressed by way of entropy encoding. The method comprises: receiving data comprising the set of encoded data and a set of banded distribution data, wherein the set of banded distribution data comprises one or more pairs of values, each pair comprising a sub-range value indicating a respective sub range of the range of values and a probability value representing a (Continued)

probability of a data element of the plurality of data elements having a value within the respective sub-range; and reconstructing the information that has been compressed, by way of performing entropy decoding, based upon a probability distribution defined by the set of banded distribution data, upon the set of encoded data. A method of compressing information comprising a plurality of data elements having values within a range of values so as to obtain a set of encoded data is also provided.

25 Claims, 21 Drawing Sheets

(30) Foreign Application Priority Data

Jul. 30, 2018 (GB) .................................. 1812407
Sep. 21, 2018 (GB) .................................. 1815437

(51) Int. Cl.
*H04N 19/129* (2014.01)
*H04N 19/167* (2014.01)
*H04N 19/176* (2014.01)
*H04N 19/30* (2014.01)
*H04N 19/46* (2014.01)
*H04N 19/96* (2014.01)

(52) U.S. Cl.
CPC ......... *H04N 19/167* (2014.11); *H04N 19/176* (2014.11); *H04N 19/30* (2014.11); *H04N 19/46* (2014.11); *H04N 19/96* (2014.11)

(56) References Cited

OTHER PUBLICATIONS

Yao et al., "Multi-resolution based hybrid spatiotemporal compression of encrypted videos", Acoustics, Speech and Signal Processing, 2009. ICASSP 2009, IEEE International Conference On, IEEE, Piscataway, NJ, USA, Apr. 19, 2009 (Apr. 19, 2009), pp. 725-728. (Year: 2009).*

* cited by examiner

*100*

| 2 | 3 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 1 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 1 | 2 | 2 | 2 | 0 | 0 | 0 | 0 | 0 | 0 | 0 | 0 | 0 | 0 | 0 | 0 |
| 1 | 0 | 1 | 0 | 0 | 0 | 0 | 0 | 0 | 0 | 0 | 0 | 0 | 0 | 0 | 0 |
| 0 | 2 | 0 | 0 | 0 | 0 | 0 | 0 | 0 | 0 | 0 | 0 | 0 | 0 | 0 | 0 |
| 0 | 1 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

*FIG. 8*

METHOD AND APPARATUS FOR DECODING A RECEIVED SET OF ENCODED DATA

TECHNICAL FIELD

The present invention relates to methods, apparatuses, computer programs, and computer-readable media for decoding a received set of encoded data representing information that has been compressed.

BACKGROUND

When transmitting, or storing, image and video data it is particularly advantageous to reduce the size of the data. Techniques for encoding and decoding such data are varied and well known. Contemporary techniques provide a compromise between processing efficiency, data quality, and data compression.

Images are typically represented digitally by representing the colours of an image by a set of components each having a value. For example, the colours of an image can be represented using an RGB colour model or the YCbCr colour space wherein each pixel of an image is represented by three different values.

To compress the data, planes of the image are usually split firstly into blocks of data elements, such as blocks of 8×8 pixels, and each block then undergoes a domain transformation. Examples include discrete cosine transform and wavelet transform implementations. As is well known in the art, transformation coding is used to capture correlation structures in the data. The transformed data is then quantised to represent the large set of values using a smaller set of values and then typically undergoes a further compression step, such as entropy encoding. Entropy coding utilises frequently occurring values, or sequences of values, within a dataset in order to reduce the volume of data. For example, an entropy coding technique compresses the digital data by representing frequently occurring patterns with few bits and rarely occurring patterns with many bits.

The efficacy of each step depends on the outcome of the previous step. That is, the transformation and quantisation processes are designed to make the next step in the process more effective. For example, overall compression can be made more effective if the transform and quantisation processes represent the values of the image with frequently occurring patterns so that the entropy coding step is more effectual. Encoding and decoding by way of such approaches conventionally involve expressing the distribution of data values held by a plurality of data elements making up a set of information to be compressed in the form of an entropy function, captured in a probability distribution data set representing the value statistics for the information. This entropy function may then be used by the encoder to compress the information and by a decoder to decompress it. It is common in known applications of this technique for the probability distribution data, that is needed by the coding devices to perform this task, to be large in size, which limits the degree to which the data requirements of the overall encoding and decoding process can be reduced.

In order to make the entropy encoding step more effectual, some contemporary transformation processes (which occur prior to entropy encoding) produce a large number of zero value data elements. Such a dataset having a large number of zero value elements, either grouped together or otherwise, can be referred to as a sparse dataset. Run length encoding is often performed as part of the encoding step to reduce these zero data values.

The output of the entropy coding operation is thus a stream of data and the decoding operation is performed in a mirrored manner to the encoding operation. First the stream of data is decoded to recreate the information. To generate a series of blocks, the stream is divided and mapped to a plane of data using an inverse of the process used at the encoder and the blocks are then arranged in their location in the plane according to the order in which the blocks were received in the stream. For example, in a typical JPEG algorithm the blocks in an image are arranged in a raster pattern. The blocks are then de-quantised. The blocks are then domain transformed using, for example a wavelet or discrete cosine transformation.

It has been previously proposed to encode data in a hierarchical manner so as to reduce the overall data size of a signal. In such encoding techniques, residual data (i.e. the data required to correct low quality information present in a base layer) is used in progressively higher levels of quality. Such a hierarchical technique is described in WO 2013/171173, which proposes a tiered hierarchy of renditions of a signal. In this proposed technique, a base layer of quality represents the image at a first resolution and subsequent layers in the tiered hierarchy are residual data or adjustment layers necessary for the decoding side to reconstruct the image at a higher resolution. Techniques are proposed in WO 2013/171173 that structure the data in each layer to exploit correlation in the residual layers to reduce information entropy by transforming a block of values into a set of directional components. Each layer in this hierarchical technique, particularly each residual layer, is often a comparatively sparse dataset having many zero value elements.

The concept of a hierarchical, tiered data structure is also disclosed in earlier filed patent application GB1812407.3. Both of GB1812407.3 and WO 2013/171173 are incorporated by reference in their entirety.

It has previously been proposed to store sparse matrices using quadtrees. The techniques build a tree to store the spatial structure of the matrix. When considering any possible implementation of the known formats for reconstructing images using sparse matrices, each requires intensive memory usage. Each of the known formats that demonstrate efficiency gains require a large amount of data to be stored in memory to properly reconstruct the locations and values of the data in a matrix.

It remains a goal of industry to reduce the size of image and video data stored or transmitted and to reduce the processing time and memory utilisation of encoding or decoding sparse datasets in image reconstruction. There also exists a need for encoding and decoding techniques that facilitate further reductions in the quantity of data required to represent both the compressed information as well as the metadata required by a decoder to decompress it.

SUMMARY OF THE INVENTION

In accordance with a first aspect of the invention there is provided a method of decoding a received set of encoded data representing information that comprises a plurality of data elements having values within a range of values and that has been compressed by way of entropy encoding, the method comprising: receiving data comprising the set of encoded data and a set of banded distribution data, wherein the set of banded distribution data comprises one or more pairs of values, each pair comprising a sub-range value indicating a respective sub-range of the range of values and a probability value representing a probability of a data element of the plurality of data elements having a value within the respective sub-range; and reconstructing the information that has been compressed, by way of performing entropy decoding, based upon a probability distribution defined by the set of banded distribution data, upon the set of encoded data.

The inventors have realised that the processes of encoding and decoding data using entropy coding may be improved by basing the coding upon a set of distribution data that is itself smaller in size than the statistical data that is conventionally taken as an entropy function describing the distribution of values within that data in entropy coding. By basing the process with which a set of encoded data is decoded by way of entropy decoding upon a set of banded distribution data, rather than upon the full probability distribution data for the information that has been compressed, a decoder may decompress obtained or received encoded data with drastically reduced requirements upon memory, storage, and bandwidth that would otherwise be consumed in the process of obtaining a full set of statistics.

In some embodiments, such as those wherein the method of entropy coding used is a Huffman-type approach, there is a correspondence between data symbols comprised by the encoded data and values that may be taken by data elements in the plurality of data elements. However, in other embodiments, there may be no one-to-one correspondence, and other forms of entropy coding may be used. In approaches wherein there is such a correspondence, the encoded data typically comprises a plurality of symbols wherein each symbol corresponds to a value of one or more of the data elements, the correspondence having been configured by the entropy encoding that encoded the data in accordance with an encoding probability function, or "entropy functions", representing the relative probabilities or distributions of values of the data elements. Typically, the entropy encoding assigns or replaces each data element with a symbol such that the length of (or quantity of data occupied or required by) a symbol is assigned to or replaces a data element in a way that is dependent upon the relative frequency, that is probability, of data elements with the same value in the plurality of data elements. Preferably, this is an inverse dependence such that longer or larger symbols corresponds to less frequently occurring data element values.

The set of encoded data is typically received in the form of a data set, or a stream or other sequence of symbols produced as an output of entropy encoding by a decoder. The values within the banded distribution data are typically in order of ascending sub-range values. However, it is also possible that the pairs of sub-range and probability values might not be arranged in order in the received banded distribution data, and the probability distribution used for the entropy decoding may be obtained by a decoder by itself ordering, or implicitly ordering the values.

The receiving of the set of banded distribution data may be thought of as receiving one or more values (sub-range values), each representing a width of a sub-range, and receiving, for each width value and height value (a probability value). For example, each value may correspond to a upper or a lower bound to a sub-range. The upper and lower bounds of a sub-range might be inferred from the bound values (be they upper or lower band values) of a sub-range and an adjacent or contiguous sub-range to that sub-range. Preferably, an upper band is given by each sub-range value. The sub-range values may be thought of, in some embodiments, as "connection points" in that they represent the points (or at least the range of values-axis points) at which the edges of bars on a histogram representing the banded distribution data are positioned.

Alternatively, each value could indicate a value that is a central, or median, value in the sub-range. The values of the lower and upper bands of each sub-range may then be calculated from the known or received sub-range median values in combination.

Preferably, the range of values that may be taken by the data elements is divided into two or more contiguous sub-ranges. A sub-range may be thought of as a "band" within the range of values, hence the description of the received data as banded distribution data. Sub-ranges may have different minima or lower bounds, for example they may be a set of contiguous sub-ranges. However, in some embodiments, the banded distribution data may represent a cumulative distribution function and in such cases multiple sub-ranges may have a common minimum or lower bound and differing maxima or upper bounds.

In typical embodiments, the values within the range are discrete, and preferably correspond to integer values. However, fractional values are possible. An example application wherein discrete values would be used is the transmission of pixel values for pixels in an image in a compressed form.

Although the probability value in each pair of values in the banded distribution data represents a probability of a data element having a value within a sub-range, the probability value might not be an accurate count of the actual number of data elements, or the actual probability, within that sub-range in the information that has been compressed. Typically, the represented probability is an approximation of the true count or the probability. However, this should not exclude the possibility of the represented probability being exactly equal to the true probability of the values in a given sub-range occurring in the plurality of data elements. The probability value may otherwise be thought of as a frequency value or as representing a count of data elements in the plurality of data elements having a value within the respective sub-range.

As noted above, the banded distribution data may be represented as a histogram, in that it comprises pairs of sub-range values and probability values that may be plotted on the x-axis (data element value axis) and y-axis (probability axis) in a histogram. However, there is no requirement, necessarily, to represent any distribution data involved in this method graphically during the encoding or decoding processes. Each pair of values may be considered as indicating the width and height of a rectangle of the area of which is proportional to the frequency of a variable (being those data elements having a value in the sub-range of values) and the width of which is equal to the class interval (being the extent of the sub-range).

As noted above, the entropy decoding may be performed using any available entropy decoding approach. Preferably, a range decoder is used. Arithmetic decoding and Huffman decoding are also possible.

Typically, the set of banded distribution data comprises a plurality of said pairs of values. It will be understood that, for many types of distribution, the probability of the data element values may be more accurately represented with an increased number of pairs of values, corresponding to a more discrete histogram representing that distribution.

In such embodiments, preferably two or more of the sub-ranges are unequal in extent. The extent of a sub-range of discrete values is the extent between and including the lowest and highest values in that sub-range. This typically refers to a probability density function-type distribution, rather than a cumulative distribution. In embodiments wherein a banded distribution data represents a cumulative probability function, the two or more sub-ranges being unequal in extent typically refers to those two or more of the sub-ranges having upper bounds that are separated from the upper bound of the immediately preceding sub-range by unequal extents. Thus, in non-cumulative distribution functions, the number of values in a sub-range may be different for two or more of the sub-ranges, so that two or more of the sub-ranges are differently sized. In cumulative functions, this may mean that the number of values in a sub-range that are not within the immediately preceding sub-range (the next-largest sub-range) is different for two or more of the sub-ranges.

The receipt of banded distribution data indicating different-sized sub-ranges may represent banded distribution data that is optimised to reflect the probability distribution data, that is the actual distribution function of the data element values, more accurately. Preferably, the extent of each of the two or more of the sub-ranges is inversely dependent upon the probability density in a region of the range of values corresponding to the respective sub-range. This inverse dependence is typically configured such that sub-regions have a greater extent in regions of the range having a lower probability density. Although values in the range are typically discrete, the term probability density as used here refers to an analogous quantity to the probability density of a continuous variable. That is, the density refers to the mean probability-per-value taken over a range of values. That is, for regions of a given size within a range, the extent of a sub-range is typically greater in a region wherein the overall probability of a data element having a value in that region is lower, and smaller when the overall probability of a data element having a value in that region is higher. Thus the received banded distribution may be optimised so as to reflect more accurately the true statistical distribution of values that occur more frequently in the data, and/or to reflect less accurately the true statistical distribution of less frequently occurring values. Thus the trade-off that is achieved by the method, between the degree of compression and the amount of data required for the encoding statistics, is optimised by configuring the arrangement of the sub-ranges according to the probability distribution.

In order for a decoder to decode the information, it is typically required for the distribution function, or entropy function, based on which the information was encoded to be reconstructed. The method therefore typically involves a step of calculating the probability distribution from the banded distribution data. This may be performed in any of a number of ways. Preferably the process comprises transforming the banded distribution data, which could be considered to be or represent samples of a distribution function, into a function or set of data that represents probability values for every value in the range of values, or includes information from which such probability values can be inferred. Thus in some embodiments, the method further comprises calculating the probability distribution from the set of banded distribution data.

In some embodiments, a decoder may be configured to receive banded distribution data that represents sample values of a cumulative distribution function. In such embodiments, the decoder may be configured to reconstruct the probability distribution, from those cumulative distribution function values, in the form of a probability density function. Therefore in some embodiments the banded distribution data represents a banded cumulative distribution function, and calculating the probability distribution may accordingly comprise transforming the banded distribution data into data representing a probability density function.

Preferably, calculating the probability distribution includes applying a predetermined probability function to each sub-range of the banded distribution data. The calculation of the probability distribution typically refers to the conversion of the set of x and y values representing the sub-ranges and probabilities for those sub-ranges respectively into a function representing the probabilities for each of the values in the sub-ranges. Typically, the probability distribution will be an approximation that may differ from the true statistical distribution of the values held by the data elements, owing to inaccuracies introduced by generating a plurality of probabilities for a corresponding plurality values in a sub-range from a single probability value received for that sub-range. In typical embodiments, the encoded data has been generated by way of entropy encoding the data elements using the same probability distribution as the decoder, with the common probability distribution having been calculated from the same banded distribution data. Thus, encoding the data typically will have included a similar step of calculating the probability distribution from the banded distribution data so as to produce the probability distribution used for the entropy encoding that produced the encoded data. Typically, the same predetermined function is used for this by both the encoded and the decoder. The same function describing the approximated probabilities for all values in the range can therefore be used by the encoder and the decoder without having to transmit all of the probability values, which would have a high bandwidth cost, and by simply sending a set of banded distribution data comprising a number of pairs of probability values and sub-range values requiring far less data than the calculated probability distribution (or the true distribution in the form of probability distribution data).

The predetermined probability function is typically a rectangular function or a triangular function. Thus the function describing the variation across an individual sub-range of the probabilities may be assumed to take a particular form, such as simply having a constant value across each sub-range (rectangular function) or having a linearly increasing or decreasing value across that sub-range (triangular function). Depending upon the distribution data, various different predetermined probability functions may be appropriate and can result in the diversions between the true statistics and the approximated probability distribution calculated from the banded distribution data being minimised. The rectangular function is preferable, since the function is preferable since this is computationally simple to apply and requires no additional values to be signalled in the banded distribution data. The triangular function approach may also be applied with a preconfigured or hard-coded gradient value, or with a gradient value that is signalled in the banded distribution data for one of, multiple, or all of the sub-ranges, either together or separately. It would be understood, for example, that signalling different gradients for different sub-ranges will increase the data required by the set of banded distribution data. Other functions than the aforementioned rectangular and triangular functions are also envisaged.

As noted above, in some embodiments, the set of banded distribution data corresponds to a cumulative distribution function. In this case, different sub-ranges may share a minimum value or lower bound and may have different maxima or upper bounds. Thus, for a sub-range it corresponds to the probability of a data element in the plurality of data elements having a value of less than or equal to the upper bound of the respective sub-range. In some embodiments, probability values comprised by the banded distribution data are provided as differences between the probability values for adjacent sub-ranges, such that the actual probability values for each sub-range may be calculated by the decoder performing the method, for instance using a prefixed sum. Such approaches are advantageous in that the size of the values, that is the quantity of data required to signal them, representing the probability values may be lower if they are expressed as differences. In such approaches, the set of banded distribution data corresponding to a cumulative distribution function is advantageous, because such functions are necessarily monotonic, and therefore it is not necessary to signal a +/− sign with any of the values in order for the probability values to be known by a decoder. Thus, the use of a cumulative distribution obviates the signalling of a sign bit in embodiments wherein each probability value comprises a difference between the probability for a corresponding sub-range and that for a contiguous, preferably preceding, sub-range. This advantageously further reduces the data required by the banded distribution data.

In some embodiments, the method further comprises, for at least one of the sub-ranges, calculating, based upon the set of banded distribution data, a plurality of frequency values each of which represents a count of data elements in the plurality of data elements that have a value equal to a respective value in the sub-range, so as to obtain a probability function for the encoded data. The approach of creating a probability function with a greater number of x-values may be thought of as a higher-resolution function, and may provide the advantage that the generated function is more likely to represent the actual probabilities of values in the data elements. However, this approach may carry an additional computational overhead at the decoder owing to the additional step of calculation, for example interpolating a function between the probability values. Typically, the encoder needs to perform the calculation or interpolation in order to perform encoding using the same calculation technique or function as the decoder, and so that computational cost is incurred by the encoder also. However, this approach may have the advantageous consequence of increasing the degree of compression by way of more accurately representing the true statistical distribution of the data.

This calculation is typically performed for a plurality of, or preferably for all of, the sub-ranges. However, as an extreme example, it may also be performed with the banded distribution data containing one fewer sub-ranges than the number of values in the range. In that case, only one bar of the histogram that may represent the data would need to be sub-divided (calculating two probability values for the values in that sub-range) in order to arrive at the "continuous" (in the sense of one-frequency-value-per-value-in-the-range) distribution. As noted above, the calculation is typically performed by way of interpolation. The plurality of frequency values typically represent the counts of data elements in so far as each of these frequency values is a calculated value. It is preferably an estimate, and may as such be an accurate representation (that is equal to the actual value before the banding of the data) but is typically an approximation that is not precisely equal to the count. The entropy decoding is preferably performed with the obtained probability function following this calculation.

In some embodiments, the set of banded distribution data defines a Laplace distribution and comprises a pair of values characterising the Laplace distribution of which the sub-range value corresponds to, or is, a location parameter p and the probability value corresponds to, or is, a scale parameter, b. In some applications of the method the data elements typically conform (or do so approximately) to a Laplace distribution. This is generally the case for typical image data as used with the methods described later in this disclosure, for example. Such a distribution can therefore be characterised parametrically by way of two parameters, thereby sending a single sub-range and a probability value (specifically a distribution) for it. In combination, these two parameters define the sub-range and the probability of a data element having a value in that sub-range. In particular, from the Laplacian characterised by these two parameters, the probability of a data element having a value between any arbitrarily defined sub-range within the range may be inferred mathematically, by integrating the function between the bounds of the sub-range.

In some embodiments, the variation in widths of the sub-ranges and their areas in a banded histogram corresponding to banded distribution data can be defined mathematically or heuristically in terms of the parameters p and b in such a way that the banded histogram would diverge as little as possible from the Laplacian with the same parameters. This may involve no other empirical data other than a global estimate of p and b from the data elements. It is possible, once the widths are fixed, for the areas can be altered, thereby removing their relationship with the initial Laplacian ansatz, so as to fit an empirically obtained non-Laplacian distribution for the information. In such embodiments, however, it is then typically required for the y-values to be transmitted, or otherwise signalled. Conversely, if they correspond exactly to a selected pair of p and b values then it would be possible to signal those two parameters alone, as statistics metadata, thus generating identical x and y values at the decoder by way the same technique as used in the encoder. It should be noted, in relation to the use of Laplacian parameterisation, however that Laplacian distributions extend out to +/−infinity along the x-axis. For this reason, preferably the mathematical/heuristic definition used by the method, and optionally the metadata comprises x-axis truncation in order to render the range finite.

In typical embodiments, the data elements are tree node symbols defining the metadata (topology, node order) and/or data symbols defining the data of a tree data structure. For example, in a compression scheme involving encoding data using tree structures or a hierarchy of tree structures, the method may be used in combination with this approach. In particular, using entropy encoding upon the tree structures, which may preferably be sparsified data structures, can reduce the bandwidth, memory, storage, and processing required to transmit or store, for instance, the relevant information. The method further improves upon this by allowing entropy encoding and decoding to be applied to a compressed tree structure or data set or stream comprising data subsets representing such structures without the decoder having to obtain the full statistics that define the distribution of the data elements comprised by the tree data structures.

In preferred embodiments, the set of banded distribution data is received as metadata associated with the received set of decoded data. For example, the banded distribution data may receive as a header which can precede a stream comprising the encoded data.

Data elements in the information to be compressed may, in various embodiments, each contain or indicate more than one value each. For example, where the data elements correspond two pixels of an image, each pixel may have two values, for example representing the "redness" and "greenness" of that pixel and thus indicating a position within a 2D colour space. In such cases the distribution of the probabilities may be represented as a surface graph with two value ranges that may be held by a data element on two axes and probability values of the value combinations defined by positions in the plane or 2D array defined by those axes being taken by a data element on a third axis. Thus, in some embodiments, the range of values is a first range of values, and each of the plurality of data elements comprises a second value within a second range of values, and wherein the set of banded distribution data comprises one or more sets of three values, each set of three values comprising a first sub-range value indicating a respective sub-range of the first range of values, a second sub-range value indicating a respective sub-range of the second range of values, and a probability value representing a probability of a data element of the plurality of data elements having a first value within the respective sub-range of the first range and having a second value within the respective sub-range of the second range. The banding may be performed upon this two-dimensional value space distribution in the same way by the encoder producing the banded distribution data as with the previously described one-dimensional value range. Similarly, the data range may be used in the same manner by the decoder and used for entropy encoding and decoding. The data is not limited to having one or two dimensions, values, or ranges. Indeed, the data elements may each comprise a third value (representing values in an RGB colour space), or further values. These may all be treated similarly by the encoder and decoder.

It has been noted above that the representation of the statistics defining the value distribution in the information with a reduced set of banded distribution data provides an advantageous saving in data requirements. The number of bands, that is sub-ranges, in the banded distribution data has been found to be important to achieving this. In preferred embodiments, the set of banded distribution data comprises 15 pairs of sub-range and probability values, corresponding to 15 sub-ranges. The use of 15 sub-ranges specifically has been found to be optimal. This is because using a greater number of sub-ranges increases the bandwidth and processing costs by requiring more data to be sent and received. On the other hand, the use of fewer sub-ranges increases the Kullback-Leibler divergence, that is the measure of the difference between the banded distribution data and the probability distribution data that accurately represents the statistics of the information being compressed. It is envisaged, however, that the number of sub-ranges may be in the range 13-17, or more preferably in the range 14-16.

Using a predetermined or unchanging number of sub-ranges is also beneficial because it allows decoding to be performed without requiring the number of sub-ranges to be signalled or received. Thus, the decoder may perform the decoding process without having to receive this additional information that would have an additional bandwidth cost.

In accordance with a second aspect of the invention there is provided a decoder apparatus configured to execute the method according to the first aspect.

According to a third aspect of the invention, there is provided a computer-readable storage medium having stored thereon programme code configured for executing the method according to the third aspect.

According to a fourth aspect of the invention there is provided a method of compressing information comprising a plurality of data elements having values within a range of values so as to obtain a set of encoded data, the method comprising: obtaining probability distribution data comprising a plurality of probability values representing, for each of the range of values, a probability of a data element of the plurality of data elements having a value equal to the respective value; defining one or more sub-ranges of the range of values; calculating, for each of the one or more sub-ranges, a probability value representing a probability of a data element of the plurality of data elements having a value within the respective sub-range, so as to obtain a set of banded distribution data comprising one or more pairs of values, each pair comprising a sub-range value indicating a respective sub-range of the range of values and a probability value for the respective sub-range; and performing entropy encoding upon the plurality of data elements, based upon the set of banded distribution data, so as to obtain a set of encoded data. In this way, a probability distribution data set that includes the full statistics defining how values are distributed in the data elements can be converted to a set of banded distribution data that is far smaller in size than the probability distribution set while also continuing to provide an indication of that distribution, albeit with a likely reduction in the precision of this indication.

The method may further comprise sending or storing the set of encoded data and the banded distribution data such that the banded distribution data is associated with the set of encoded data. A recipient, such as a computing device configured to conform the decoding according to the first aspect, may then use the banded distribution data to decode the encoded data.

The method may further comprise defining a plurality of sub-ranges of the range of values such that the set of banded distribution data comprises a plurality of said pairs of values. This defining of the sub-ranges may be performed such that two or more of the defined sub-ranges are unequal and extent. As noted earlier in this disclosure, it is this capability that allows the efficiency of the encoding and decoding to be further optimised.

In particular, in some embodiments, defining the plurality of sub-ranges is performed such that the extent of each of two or more of the sub-ranges is inversely dependent upon the probability density in a region of the range of values corresponding to the respective sub-range.

In preferred embodiments, defining the plurality of sub-ranges is performed such that, for regions of a given size within the range of values, the number of sub-ranges is greater within a region within which the probability of a data element of the plurality of data elements having a value within the region is greater, and is smaller within a region within which the probability of a data element of the plurality of data elements having a value within the region is lower. A region that is referred to here means a portion of the range the given size may be any given proportion of the range and is not necessarily have to be any specific size. It is advantageous that the entity of the sub-ranges, or the density of the sub-range bounds is greater in parts of the range containing more probable values and lower in parts of the range containing less probable values. The density here may be considered to be a measure of how close together or how closely positioned sub-ranges are within a given region of the range. In other words, the density corresponds to a measure of an average "number of sub-ranges across a given portion of the range". It is by way of this particular optimising technique that the encoder may produce banded distribution data that maximises the accuracy with which the banded distribution data represents the true statistics of the data while minimising the number of values required to be comprised by that banded distribution data.

In some embodiments, the banded distribution data is obtained by way of an intermediate calculation step involving initial sub-ranges. In such embodiments, defining the plurality of sub-ranges comprises: defining a plurality of initial sub-ranges of equal extent; and calculating adjustments to one or more bounds of the initial sub-ranges so as to obtain a set of adjusted bounds defining a plurality of sub-ranges, two or more of which being unequal in extent, thereby defining the plurality of sub-ranges. The plurality of initial sub-ranges may be greater in number than the sub-ranges used in the banded distribution data. This is preferably the case, since it can allow the probability values for the banded distribution data to be calculated more efficiently and accurately by virtue of basing that calculation upon a greater number of initial sub-range values. The initial sub-ranges may be greater in number than the final sub-ranges by factor of 2, 3, 10, 100 or 1,000, for example, or by approximately these factors. For example, there are typically 32,000 values in the range of values, and 10,000 initial sub-ranges, and 15 sub-ranges in the banded distribution data. The initial sub-ranges are preferably defined by dividing the range into a predetermined number of initial sub-ranges.

The conversion of the larger number of initial sub-ranges into 15 sub-ranges, or any other reduced number of sub-ranges, typically involves a clustering or merging operation, preferably performed on the sub-ranges in a neighbour-with-neighbour manner. This operation to reduce the number of sub-ranges may be performed in a single operation, or it may be performed multiple times, that is as a plurality of operations, preferably a set of recursive operations. For example, the number may be reduced from 10,000 to 1,000, and then from 1,000 to 15, or it may be reduced from 10,000 to 9,999, and then from 9,999 to 9,998, and so on, or it may be reduced from 10,000 to 15.

The number of initial sub-ranges may be chosen or configured such that the number of values in the range is divisible by the number of initial sub-ranges without leaving a remainder. Alternatively, the initial sub-ranges may be approximately equal in size, that is they may contain numbers of values that are as equal as is possible, in the case that the number of values in the range is not perfectly divisible by the number of initial sub-ranges.

In embodiments wherein the probability distribution data represents a cumulative distribution function, the method may comprise defining a plurality of initial sub-ranges having upper bounds that are separated by the same extent, that is the "extent" in the sub-range in the case of a cumulative probability function that refers to the extent from the first or lowest value following or not included in an immediately preceding or smaller sub-range to the upper bound or maximum value included in the respective sub-range.

Preferably, the adjustments are calculated such that all bounds are adjusted, or may be adjusted, depending on the probability distribution. There may be a beneficial effect achieved by adjusting some bounds but not others, depending on the particular distribution data. It is likely that a greater benefit is achieved in regions of the range having particularly high or low probabilities, since it is those regions that lend themselves to providing the aforementioned optimisation to the greatest degree by being represented with smaller and larger sub-ranges respectively.

The plurality of sub-ranges that are defined by way of adjusting the bounds, that is the sub-ranges represented in the banded distribution data, are preferably achieved by adjusting a bound of each of the plurality of initial sub-ranges.

Typically, the calculated adjustments comprise any of: altering the position within the range of a bound to an initial sub-range; removing a bound to an initial sub-range so as to combine two initial sub-ranges into a single sub-range; and inserting a bound so as to divide an initial sub-range into two sub-ranges. The position typically means the value within the range to which the bound corresponds. That is, altering the position typically corresponds to altering the maximum and/or the minimum value of one or more of the sub-ranges. It will be understood that if an initial sub-range being processed in the adjustment operation is "leftmost" in the range (which may be understood as containing the lowest values in the range) the lower bound of that sub-range typically cannot be adjusted unless a new sub-range is added and itself becomes the new leftmost sub-range. Similarly, if a lower bound of a non-leftmost sub-range or an upper bound of a rightmost sub-range is adjusted, it is typically necessary to adjust the neighbouring sub-range of the sub-range in question at the same time, or the sub-range and its neighbour will overlap.

Preferably, once the sub-range bounds have been determined, the probability values for those sub-ranges may be calculated. Preferably, calculating a probability value for each of the plurality of sub-ranges comprises, for each of sub-ranges, calculating a probability of a data element of the plurality of data elements having a value within the respective sub-range in accordance with a respective sub-set, corresponding to the values within the respective sub-range, of the probability values comprised by the probability distribution data. Thus it is possible to base the probability values for the banded distribution data on the probability distribution data, or the true distribution of the values. This is likely to provide a more accurate reflection of the true statistics in the banded distribution data, at the cost of the computational cost being typically increased by virtue of the need to process all of the individual probability values in the sub-range, and in so doing potentially having to process a plurality of data elements in a plurality of sub-ranges.

Another approach to the calculation of the probability values from the banded distribution data involves using the probability values for the initial sub-ranges. Thus, the method may further comprise calculating, for each of the plurality of initial sub-ranges, an initial probability value representing a probability of a data element of the plurality of data elements having a value within the respective initial sub-range, wherein calculating the probability values for the sub-ranges is performed in accordance with the plurality of initial probability values. This process may be visualised as generating a histogram made up of equally sized groups of values (equal initial sub-ranges) where the probability values, that is the heights of the histogram bars for each of the equally sized groups, represents the probability of the data element having a data value in the group. Thus, it is possible to calculate the sums or the average values, such as mean values, for the probabilities for each sub-range of the banded distribution data from the initial probability values of the initial sub-ranges. For example, it is possible to calculate the sum or average of the initial probability values that correspond to, or fall within a sub-range so as to obtain the probability value for the sub-range. This may be performed, for example, by finding the piecewise linear distribution of the initial probability values. This is a computationally less expensive approach than basing the calculation of the banded distribution data on the individual values in the probability values in the distribution data.

Typically, the defining the plurality of sub-ranges is performed by way of an iterative calculation and/or by way of dynamic programming. For example, when starting from a plurality of initial sub-ranges that equally divide the range, the bounds of the initial sub-ranges may be shifted, added to, or removed from, using an iterative process wherein any or all of the steps are repeated so as to increase the number of sub-ranges indicating the portion(s) of the range having high probability density and decreased the number of sub-ranges indicating portions having low probability density. The iterations may be controlled by a cost function and the derivative of the cost function. Well-known numerical analysis techniques for finding a local minimum of a cost function may be incorporated in the iteration scheme.

As an alternative to, or a supplement to, this iterative approach, dynamic programming may be used in adjusting the bounds of the sub-ranges. The positions of the values defining the sub-ranges can be optimised towards the configuration described above by way of dividing the task of calculating the bounds for the plurality of sub-ranges in the banded distribution data in the plurality of sub-ranges in the banded distribution data into a plurality of sub-problems and then recursively finding the optimal solution to these sub-problems.

Preferably, the number of sub-ranges of the range of values that are defined is 15, such that the number of pairs of sub-range and probability values comprised by the banded probability data is 15. Thus the encoder may be configured to produce banded distribution data comprising a number of sub-ranges that is optimal as described in relation to the first aspect.

In accordance with a fifth aspect of the invention there is provided an encoder apparatus configured to execute the method according to the fourth aspect.

According to a sixth aspect of the invention there is provided a computer readable storage medium having stored upon programme code for executing the method according to the fourth aspect.

According to a seventh aspect of the invention there is provided a system comprising a decoder apparatus according to the second aspect and an encoder apparatus according to the fifth aspect, wherein the decoder apparatus is adapted to receive data comprising encoded data and banded distribution data form the encoder apparatus. The decoder apparatus may be adapted to receive said data directly or indirectly. This may be transmitted via data connection network or may be received by way of a storage medium.

BRIEF DESCRIPTION OF THE DRAWINGS

FIG. 8 shows a grid of values before decoding and after reconstruction in an example decoding method suitable for use with the present invention;

FIG. 9b illustrates a recreated grid at the stage of the process illustrated in FIG. 9a;

FIG. 10b illustrates a recreated grid at the stage of the process illustrated in FIG. 10a;

FIG. 11b illustrates a recreated grid at the stage of the process illustrated in FIG. 11a;

FIG. 12b illustrates a recreated grid at the stage of the process illustrated in FIG. 12a;

FIG. 14b illustrates a recreated grid at the stage of the process illustrated in FIG. 14a;

FIG. 15b illustrates a recreated grid at the stage of the process illustrated in FIG. 15a;

FIG. 16b illustrates a recreated grid at the stage of the process illustrated in FIG. 16a;

FIG. 17b illustrates a recreated gild at the stage of the process illustrated in FIG. 17a;

FIG. 18b illustrates a recreated gild at the stage of the process illustrated in FIG. 18a;

FIG. 19b illustrates a recreated gild at the stage of the process illustrated in FIG. 19a;

DETAILED DESCRIPTION

Figure 1:
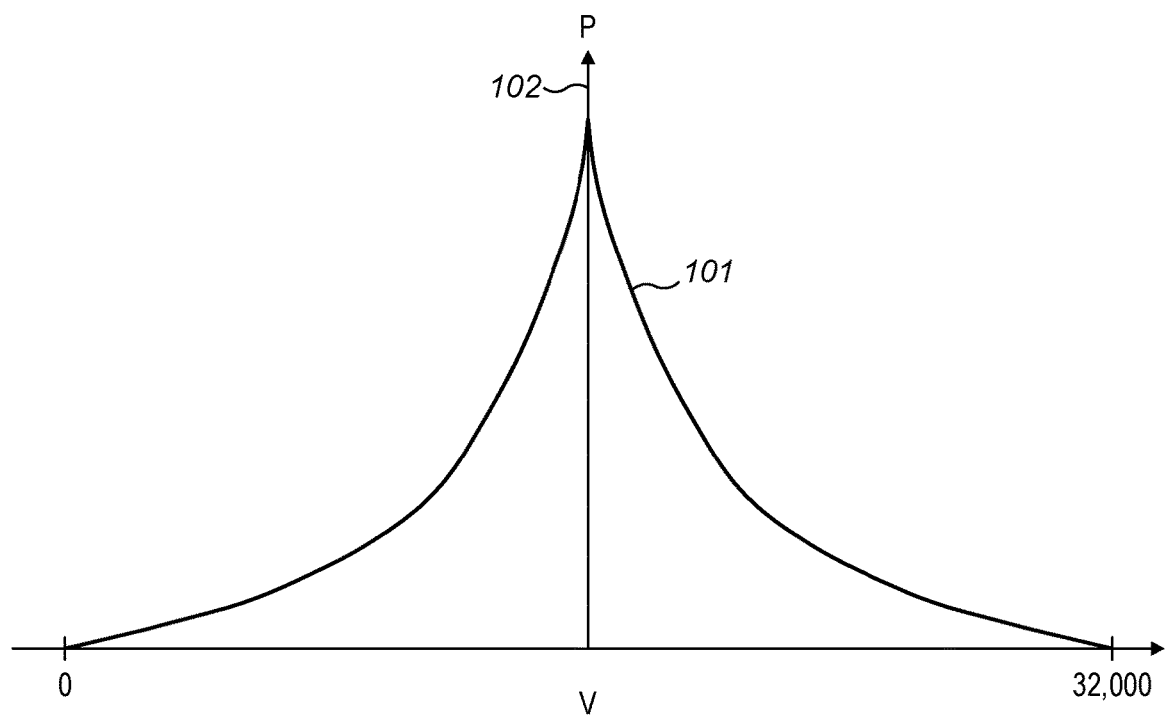
FIG. 1 is a graph showing the distribution of values of a plurality of data elements used in a first example method according to the invention.
Figure 2:
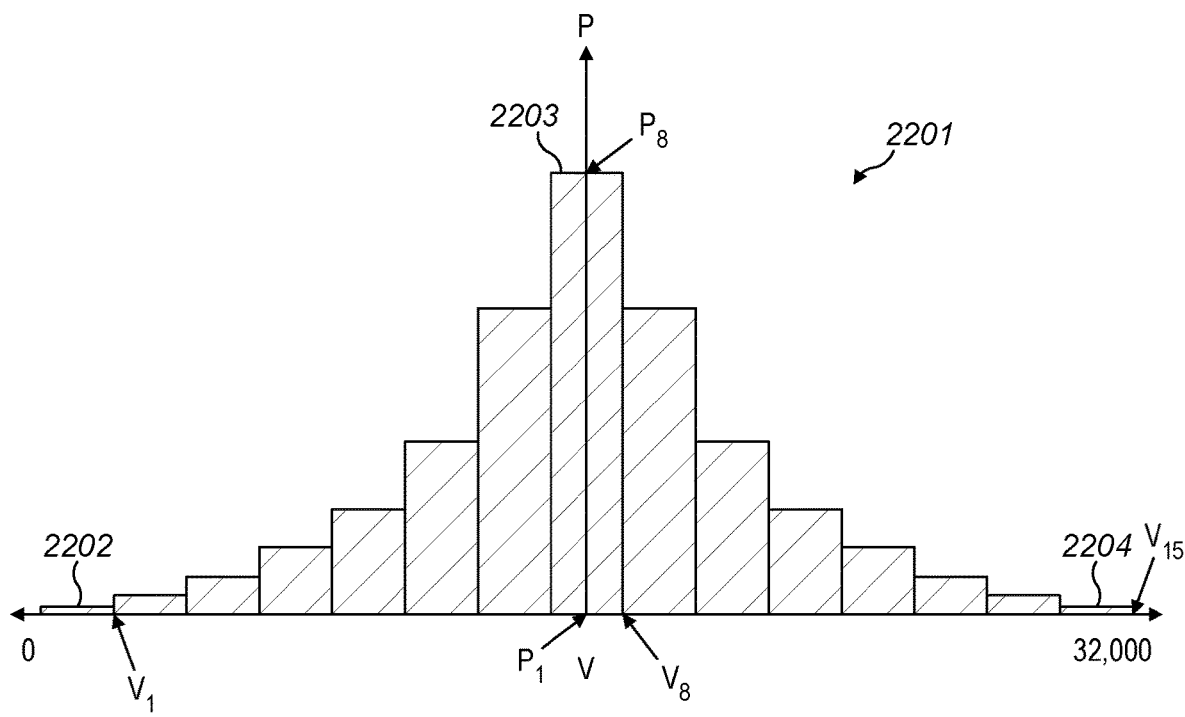
FIG. 2 is a graph showing a histogram representing the banded distribution data obtained from the probability distribution data represented in FIG. 1 according to the first example method.
Figure 3:
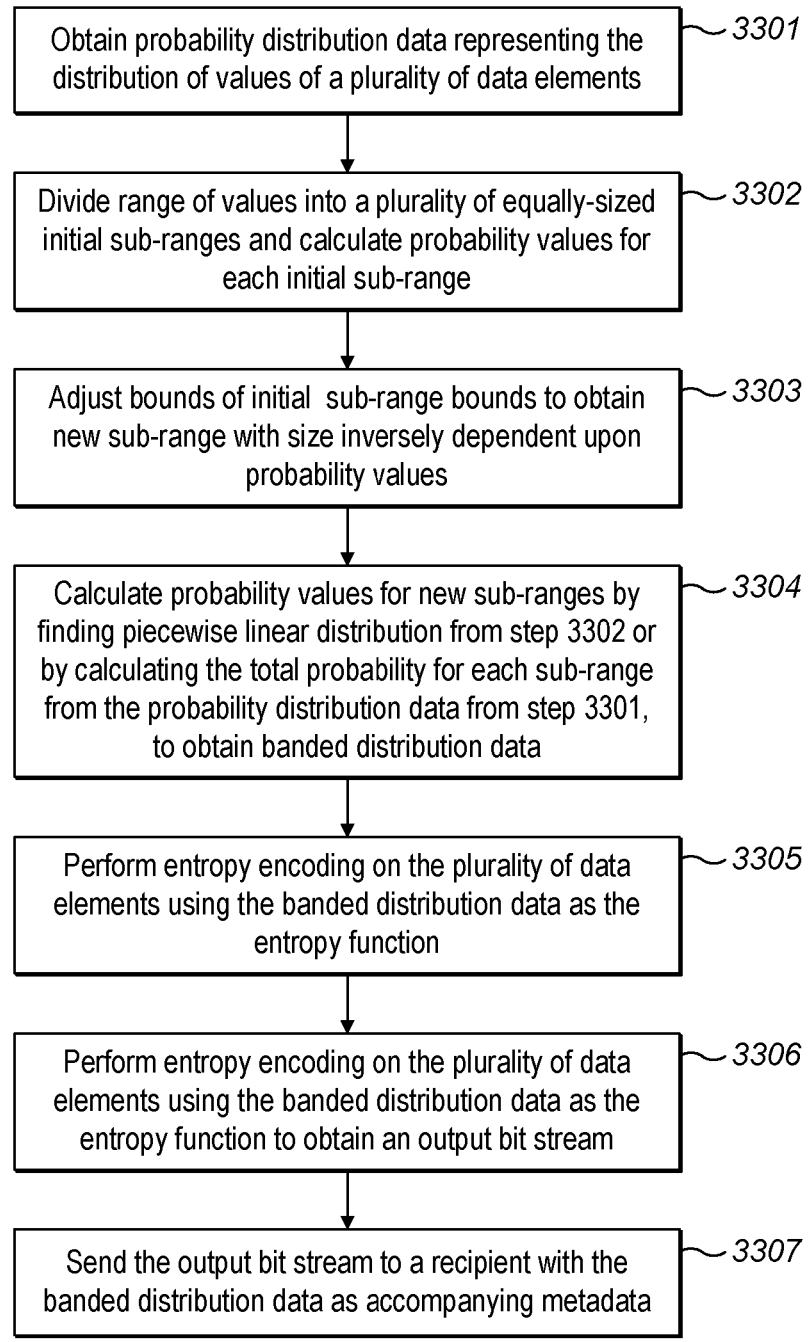
FIG. 3 is a flow diagram illustrating encoding steps comprised by a second example method according to the invention.

With reference to FIG. 1 and FIG. 2, a first example method of encoding and decoding a set of information is now described. The set of information to be compressed (not shown) comprises a plurality of data elements having values. In the present example, each data element represents a pixel and has a value representing a pixel value, or an intensity value, for that pixel. For the sake of simplicity, this may be thought of in the present case as a greyscale image wherein each pixel may have a value between 0 (corresponding to zero intensity, or a white pixel) and 32,000 (representing black). It will be understood, however, that the information to be compressed may be in any of a number of forms, according to the invention, with the image of the present case having been chosen for exemplary purposes only.

The graph in FIG. 1 shows that the distribution of values held by pixels in the image takes the form of a Laplace function, with a maximum, that corresponds to the pixel value that is held by the greatest number of data elements (pixels) in the image, indicated at 102, halfway along the range.

In the present example, the values that the data elements may take are discrete, and, specifically, consist of the integers between 0 and 32,000. For simplicity of illustration, the graph in FIG. 1 depicts the distribution as a smooth line. However, this should not be taken as indication that the values corresponding to the axis labelled V is continuous in nature.

An encoder device obtains the probability distribution data 101 and divides the range into a plurality of sub-ranges. This may be thought of as grouping the 32,000 bars (which are not shown individually, as noted above) in the probability distribution function 101 into a reduced number of bins. In the present example, the encoder device is configured to divide the range into 15 bins, or sub-ranges.

The encoder device can then calculate, for each of the 15 sub-ranges, a probability value representing the probability that a given one of the plurality of data elements has a value falling within the respective sub-range. This is performed by calculating a sum of the probability values from the probability distribution function 101 for the values falling into each bin. Thus a histogram 2201 with bars corresponding to the defined sub-ranges effectively being generated, by virtue of generating a set of pairs of sub-range values (V) and associated probability values (P).

Thus, banded distribution data 2201 is produced. In the present case, this includes 15 pairs of sub-range and probability values. For instance, the sub-range indicated at 2202 is the lowest sub-range. The extent of the first sub-range 2202 is 0-2,133. Thus, the minimum or lower bound of the first sub-range 2202 is 0 and the maximum or upper bound of that sub-range is 2,133. The value (V) of each sub-range is stored as a sub-range value. The sub-range value, $V_1$, for the first sub-range 2202 is 2,133. The lower bound of the first sub-range 2202, namely 0, may also be stored. However, in the present example only upper bounds are used to define sub-ranges, and it is either signalled separately to a decoder device that will reconstruct the compressed data, or is otherwise predetermined or known by that device, that the lower bound of the earliest sub-range 2202 is 0. Similarly, the lower bound of the lowest sub-range, that is the minimum of the range of values, may take other values in other examples, according to the nature of the information to be compressed.

The lower bounds of the second and subsequent sub-ranges shown in FIG. 2 may be inferred from the upper bounds of the sub-range preceding each one, by virtue of the sub-ranges being contiguous.

The probability value, $P_1$, for the lowest sub-range 2202 is calculated by adding together the probability values from the probability distribution function 101 for all of the values from 0-2133 inclusive. It can be seen that, owing to the shape of the Laplace distribution, which is symmetrical about the central sub-range 2203, the lowest 2202 and highest 2204 have the lowest probability values ($P_1$, $P_{15}$), of all of the sub-ranges in the banded distribution data 2201, and that the central, or medium sub-range 2203 has the greatest probability value, $P_8$.

The banded distribution data shown in FIG. 2 is then used by the encoder device to perform entropy encoding upon the plurality of data elements making up the image information to be compressed. Specifically, the banded distribution data is taken to be the entropy function using which the entropy encoder determines how the input image information is to be converted into an output bitstream.

It is well known that entropy encoding achieves data compression by taking advantage of the differences in probabilities of data elements of a dataset to be compressed having different values. It will be appreciated that, in the present example, data compression is achieved by virtue of indicating these differences in probabilities to the entropy encoder by way of the banded distribution function. It will also be appreciated, however, that some of the probability distribution information is lost by virtue of grouping the probability distribution data 101 into sub-ranges 2202. This means that, within a given sub-range, the entropy encoder is not provided with as accurate an indication of the differences in probabilities of the values within that sub-range occurring in the dataset as would be provided by the probability distribution data 101, were that to be used as the entropy function. Thus the banding process, that is the process of increasing how discrete the probability information for the dataset is, is likely to result in the degree of compression achieved by the entropy encoder being reduced. Advantageously, however, the set of banded distribution data 2201 is far smaller in size, that is requires far less data, than the probability distribution data 101, since the former comprises 15 pairs of integers whereas the latter requires 32,000 pairs of integers. It can be seen, therefore, that defining the statistical information about the information being compressed in the form of banded distribution data provides a beneficial saving in bandwidth, memory, and computer processing resources when compared with methods that use the full statistics 101. This effect has been shown to be more significant than the disadvantageous loss of compression caused by compressing the data using banded distribution data 2201 rather than the full probability distribution data statistics 101.

In variations of the present example, further steps may be applied to the banded distribution data prior to using that data to encode the plurality of data elements. In the example shown, the representation of the banded distribution data 2201 as a histogram is indicative of the entropy function effectively being input to the entropy encoder as a stepped function, that is a function wherein all of the values in a given sub-range are deemed to have the same likelihood of occurring in the plurality of data elements. This is advantageous in that it is computationally simple for the encoder and decoder to convert the pairs of probability and sub-range values to such a function, and also because it requires only a single pair of numbers to be defined for each sub-range, meaning that the size of the set of banded distribution data is minimised.

In other variations, however, other mathematical functions may be applied to the sub-ranges. For example, rather than a rectangular function as shown, a triangular function may be used.

This can involve applying a gradient to each of the bars shown in 2201 such that the tops of the bars have a slope. For example, a "positive" slope may be applied to the lowest seven sub-ranges, while a "negative" slope, that is a negative gradient, may be applied to the tops of the final, or highest, seven bars in FIG. 2. This would project an estimated increase or decrease, linear in nature, across each of the sub-ranges, and might be used in order to increase the correspondence between the banded distribution data and the true statistics 101 representing the distribution of values in the plurality of data elements. The gradient may be the same for a plurality of sub-ranges, and so may be predetermined, or hard coded, or may be signalled explicitly once for a plurality of sub-ranges. In other variations, each of the pairs of sub-range and probability values ($V_i$, $P_i$) may be accompanied by a third value ($G_i$) indicating the gradient to be applied to each sub-range, or indicating a deviation of the gradient of that sub-range from a predetermined or default gradient. In this way, varying gradients may be signalled, thus increasing the correspondence between the probability distribution calculated from the set of banded distribution data and the probability distribution data 101 from which the banded distribution data 2201 was obtained. It will be understood, however, that this increases the quantity of data required to store and/or send the banded distribution data.

In other variants, a curve may be applied to each sub-range. In yet further variations, an interpolation process may be used in order to generate a curve representing an estimate of the probabilities or values held by the data elements based upon the limited number of probability values in the banded distribution data. The use of such an interpolated curve to encode the data elements may achieve a greater degree of compression than the use of a stepped function as shown in FIG. 2. However, this advantage is achieved at the cost of computational and bandwidth resources being consumed by the interpolation process by both the encoder and the decoder.

The encoded dataset may then be provided to a recipient decoder device, for example by sending the encoded data as a bitstream, across a data communication network for instance. The encoded dataset is provided to the decoder together with the banded distribution data, with the latter being included as metadata in a header preceding the bitstream. The decoder then uses the banded distribution data to obtain an entropy function that may be used in entropy decoding the encoded bitstream. The decoder device is configured such that the same entropy function as was used by the encoder to compress the information can be obtained from the banded distribution data. When the encoding was performed using a stepped function such as that shown in FIG. 2, for example, the decoder is configured to correspondingly convert the pairs of probability and sub-range values into a stepped function identical to that used to perform the encoding.

The decoder then performs entropy decoding, in the present example range decoding, although other forms of entropy coding may be used as long as the coding methods used by the encoder and decoder are identical, upon the received bitstream. Thus the information that was compressed by the encoding device is reconstructed by the decoding device.

In the above noted variations, or any other variations, upon the above described method, wherein further processing is applied to the banded distribution data by the encoder so as to alter or refine the entropy function to be used for encoding, those same additional functions are configured to be performed by the decoder also. For instance, where the decoder uses a rectangular function, or a triangular function with unchanging gradient values, the decoder will be configured to correspondingly use a rectangular or triangular function identical to those applied by the encoder, respectively. This configuration may be preconfigured in the decoder, or configuration parameters defining the additional functions or processing to be applied may be signalled, such as in the header accompanying the received bitstream.

Although the above described method provides advantageous effects by way of decreasing the data footprint of the encoding statistics, it is possible to obtain further beneficial effects by optimising the way in which the sub-ranges are arranged. This is demonstrated in the following example.

Figure 4:
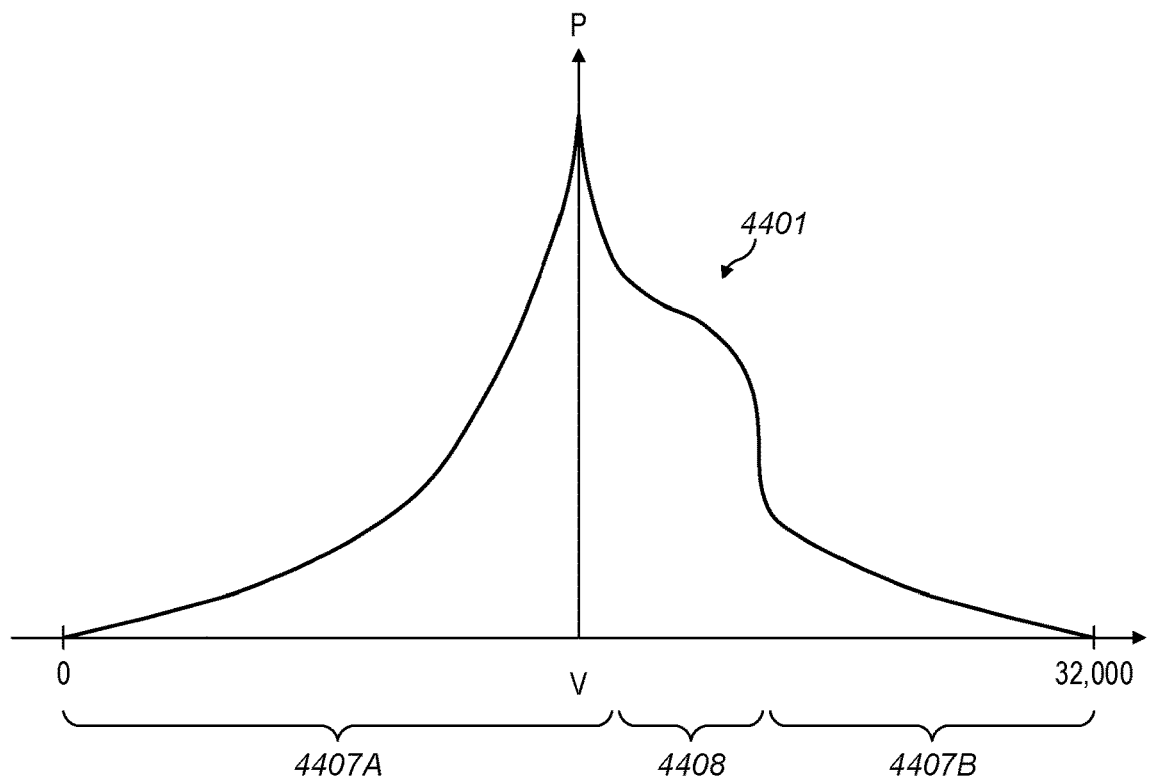
FIG. 4 is a graph showing the probability distribution data for a plurality of data elements to be encoded by the second example method according to the invention.

With reference to FIGS. 3-6, a second example method of encoding a set of information according to the invention is described. At step 3301 a set of probability distribution data representing the distribution of values of a plurality of data elements is obtained by an encoder device. The probability distribution data is illustrated in FIG. 4, indicated by the line at 4401. For the sake of consistency with the previous example, the extent of the range is the same in the present example as in the first example, namely 0 to 32,000. Likewise, the probability distribution data 4401 comprises 32,000 pairs of discrete values representing the probability of each of the values occurring in a plurality of data elements of information to be compressed, although this is again illustrated as a smooth line such that individual bars representing these individual values are not visible in the figure.

The probability distribution data 4401 is different from that of the previous example in that, in the present case the distribution is not symmetrical about the median. Thus the shape of the distribution of values corresponds to a Laplace form in regions 4407A and 4407B, with a deviation from this form at region 4408. In this region, it can be seen that the distribution includes a "hump", wherein the relative probabilities of the values are greater than they would be if the shape of the function perfectly followed a Laplace form. It should be noted that, although the 4407 Laplace-resembling regions have a shape identical to the corresponding regions in FIG. 1, the total area under the graph, that is the sum of all probabilities over the entire range, is unity in each case, and as such the graphs are not necessarily shown to scale.

The form shown in FIG. 4 of the probability distribution data does not necessarily represent any particular real information or type of information, but has been chosen to illustrate the principle of optimising the banded distribution data sub-range arrangement.

Figure 5:
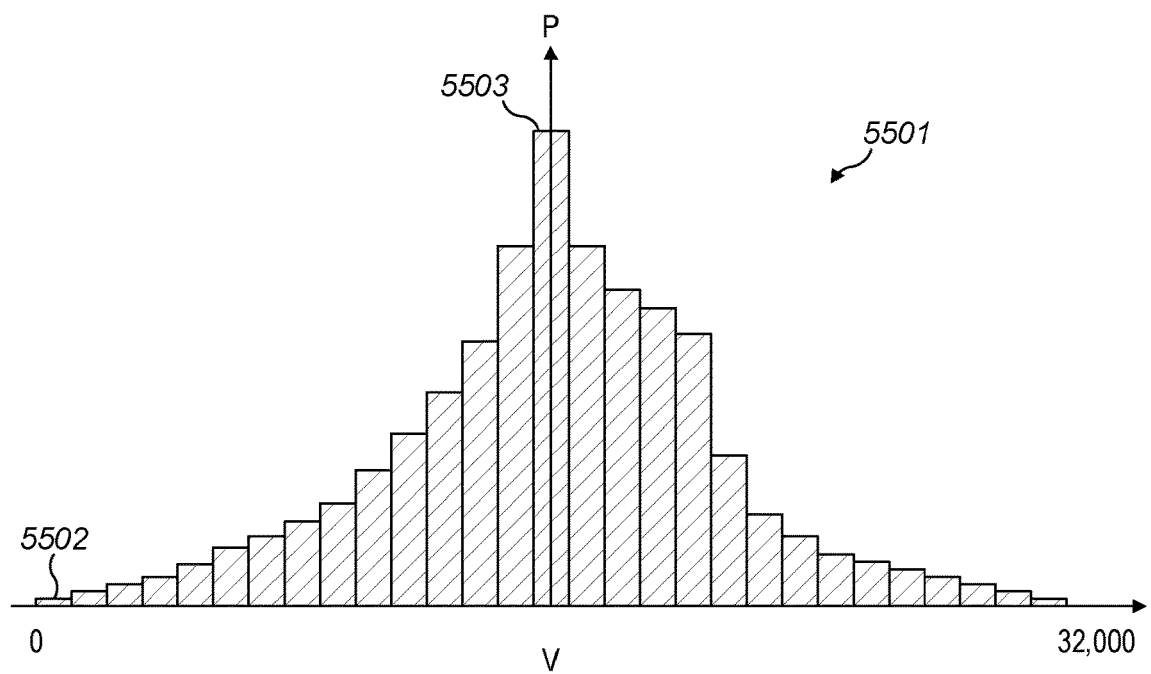
FIG. 5 is a graph showing a histogram representing initial sub-ranges and corresponding probability values generated during the second example method according to the invention.

At step 3302 the range of values shown on the V axis in FIG. 4 is divided into a plurality of equally-sized initial sub-ranges. The step is performed similarly to the dividing process in the above-described example and illustrated by way of FIG. 2. The initial sub-ranges are illustrated in FIG. 5 for the present example. In this case, the range is divided into 29 sub-ranges shown in the form of a histogram 5501. This comprises 29 bars corresponding to the 29 initial sub-ranges and having heights corresponding to the probability values for the initial sub-ranges that are also calculated at step 3302. It would be possible for the encoder and decoder to use these initial sub-ranges and their associated probability values to perform entropy coding for the purposes of compression. However, the encoding and decoding process may be improved, that is made more efficient, in two ways. Firstly, it would be beneficial, as noted in describing the first example, above, to have a reduced number of sub-ranges, since this permits the sending of encoding statistics with a reduced quantity of metadata, namely fewer pairs of probability and sub-range values. Secondly, an improvement to the degree of compression provided by the entropy coding may be achieved by way of sizing the sub-ranges according to the probability values of the values within the range contained within or close to the sub-ranges.

At step 3303 the bounds of the initial sub-ranges are adjusted so as to obtain new sub-ranges, the sizes of which are inversely dependent upon their probability values. The new sub-ranges 6601 are shown in a histogram in FIG. 6. It can be seen that the number of new sub-ranges is less than the number of initial sub-ranges. In this example, the bounds of the initial sub-ranges have been adjusted, including removing some of those bounds so as to merge two or more sub-ranges into a lesser number of sub-ranges, or a single sub-range. Thus there are 16 sub-ranges in the banded distribution data 6601.

Figure 6:
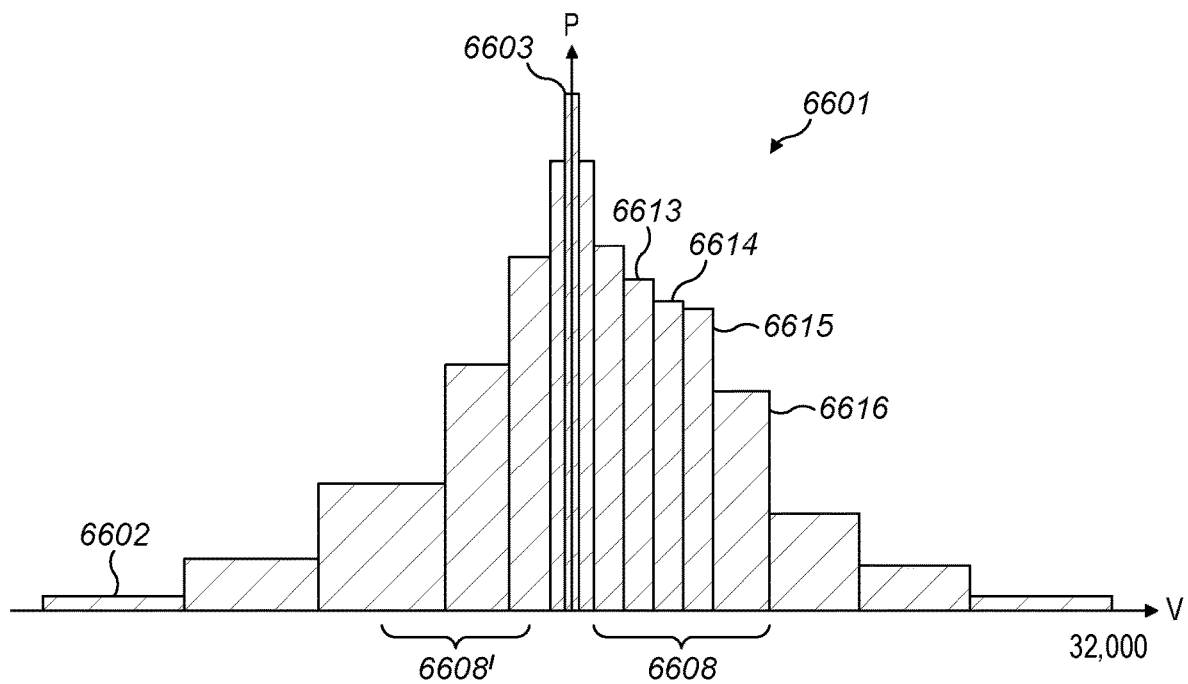
FIG. 6 is a graph showing a histogram representing banded distribution data obtained by the second example method according to the invention.

The adjustment that leads from the histogram shown in FIG. 5 to that shown in FIG. 6 also includes resizing the sub-ranges where appropriate. It will be understood that the degree of compression that may be achieved by entropy encoding is greater when the accuracy with which the entropy function of the information to be compressed is greater. It will also be understood that a greater degree of compression may be achieved in this way for a given region of a range when that region corresponds to values that occur more frequently in the information to be compressed than if the region corresponds to values that occur less frequently in that information. In other words, it is beneficial to represent more probable values more precisely, and less probable values less precisely, given a limited degree of precision being possible for the whole range.

The bounds having been adjusted at step 3303 in accordance with this principle is evident from FIG. 6. For example, the sub-range illustrated by the lowest bar on the histogram, 6602, is also the widest. This is because, as can be seen from FIGS. 4 and 5, the probability of values in that region of the range being taken by a data element in the information to be compressed is comparatively low, in contrast to the values in the central portion of the graphs at FIGS. 4-6, for instance. The central bar 6603 corresponds to the peak of the distribution, and to the initial sub-range bar 5503 in the initial data illustrated at FIG. 5. Accordingly, the new sub-range indicated by the central bar 6603 in the banded distribution data 6601 is smaller in extent than the initial sub-range indicated by the bar at 5503. Similarly, the new lowest sub-range 6602 is wider than the lowest sub-range in FIG. 5, because imprecision with regard to how these lower-probability values are represented has a lesser negative impact upon compression than would be suffered if a higher-probability portion of the distribution were indicated equally imprecisely. Overall, it can be seen from FIG. 6 that the bars have been merged and adjusted in terms of their bounds or extents so that the width of each bar is greater where the height of the corresponding parts of the probability distribution data 4401 is greater, and vice versa. The "hump" region also demonstrates this, in that the hump region 6608 contains a greater number of sub-ranges than the symmetrically opposite region 6608'. This is a result of the overall probability of a data element of the plurality having a value within the hump region 6608 being greater than the probability for the opposite region 6608'. The encoder has therefore optimised the banding by allocating a greater number of sub-ranges to the hump region 6608, and comparatively reducing the number of sub-ranges in the lower-probability part of the distribution.

Additionally, it can be seen that the rate at which the width of the bars from 6613-6616 increases reflects the rate at which the probability decreases with increasing V-axis values in the 4408 region. With progressively higher values in the region 4408, the rate of probability decrease begins relatively slow and then increases sharply towards the upper end of that region. Accordingly, bars 6613, 6614, and 6615 are of similar width, whereas bar 6616 is of considerably greater width, owing to the distribution corresponding to the 6616 sub-range having a much lower overall probability than the distribution region corresponding to bars 6613-6615.

At step 3304, probability values are calculated for the new sub-ranges that are shown on the V axis in FIG. 6 so as to arrive at the banded probability values indicated by the heights of the bars of the histogram shown at 6601. This may, for example, be based upon the probability values for the initial sub-ranges found at step 3302, for instance by finding the piecewise distribution from that data. This may also be calculated by calculating the total probability for each sub-range from the probability distribution data from step 3301. Thus banded distribution data is obtained.

At step 3305 the encoder device performs entropy encoding on the plurality of data elements using the banded distribution data obtained at step 3304 and shown in FIG. 6 as the entropy function for the data values. As noted in describing the first example, this may involve further processing the banded distribution data in order to take the entropy function as being of a form other than the stepped function shown in FIG. 6.

At step 3307 the output bitstream that is produced by the entropy encoding process is sent to a recipient with the banded distribution data as accompanying this data. The recipient is therefore able to decode the data using an entropy decoder configured with the same parameters as the entropy encoder, and using the minimal set of banded distribution data, rather than for statistics, in order to do so. The degree of compression achieved by the process of the second example is expected to be greater than that achievable by the first example, because of the optimisation of the banding performed before encoding and sending the data.

The distributions shown thus far are represented as resembling probability density functions, having probability values that represent the probabilities of individual values occurring in the plurality of data elements in the probability distribution data. It is also envisaged that cumulative distribution functions may be used in this case, probability values represent the probability that any data element takes a value less than or equal to a given value in a range, as opposed to the probability that the element will take a value equal to that given value in a range.

Figure 7:
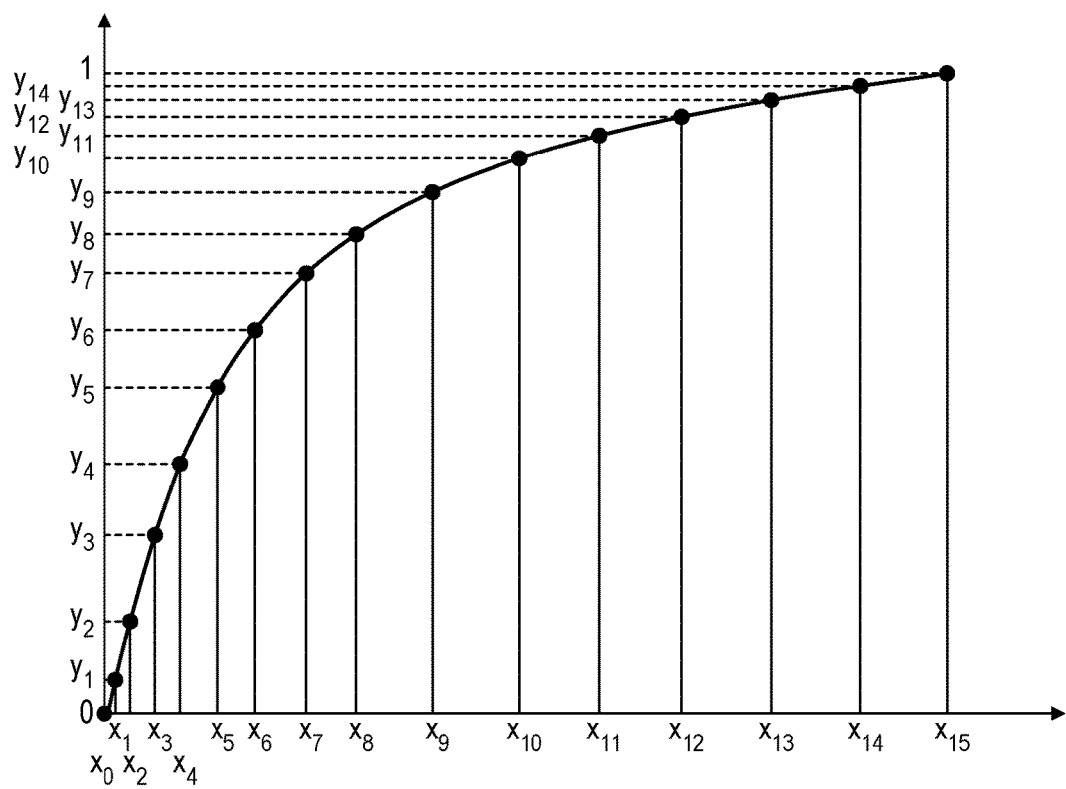
FIG. 7 is a graph illustrating a cumulative distribution function used by a third example method according to the invention.

With reference to FIG. 7, a third example is now described. A cumulative distribution function (CDF) is determined at the encoder for a set of data (for example, the residuals data included in a tile, the streamlengths included in a tableau, the tileset and/or tableaset indices, etc.). The CDF could be derived, for example, from a histogram associated with the set of data. A histogram is typically an estimate of a probability distribution function (pdf) based on real samples. The histogram and the corresponding CDF may be generated using any suitable methods. Alternatively, a theoretical probability density function could be used. For simplicity, the CDF shown in Figure E is shown as a continuous function, but it is to be understood that it could also be constructed by summing the histogram bins and therefore it would look like a stepped curve.

The CDF is "sampled" at specific points (e.g., $x_0$ to $x_{15}$) generating corresponding values (e.g., $y_0$ to $y_{15}$). In the present embodiment, 16 samples are used. However, it is to be understood that a different number of samples can be used without departing from the spirit of the invention. Once that is done, a vector is constructed including the values other than the first and the last (since they always correspond to 0 and 1, respectively) and the specific sampling points. In the present example, this means 14 values ($y_1$ to $y_{14}$) and 16 sampling points ($x_0$ to $x_{15}$). These values corresponds, in the type described, to the 14 values encoded using 2 bytes (16 bits) including their mantissa (i.e., mantissa16[14]) and to the 16 sampling points (i.e., x_axis_type[16]) encoded using the number of bits specified by the type (i.e., x_axis_type).

When the decoder receives this vector, the decoder would read its content, in particular the sampling points and the values, and reconstruct the CDF by, for example, interpolating the values. In other words, a decoding module receives information about a statistical distribution (e.g., a CDF) in the form of a set of sampled values (y) and a corresponding a set of sampling points (x). It uses the sampling values to reconstruct the statistical distribution, for example by interpolating the values and reconstructing the statistical distribution. For example, in the case of a CDF, it means reconstructing the CDF curve from the values by interpolating them. The decoding module uses said statistical distribution when decoding a corresponding set of data associated with it. In this way, the information about statistical distribution of sets of data, which typically would be expensive in terms of bits required to be used when sending from the encoding module to the decoding module, can be effectively compressed without compromising the accuracy. In particular, using a CDF rather than a histogram is particularly efficient due to the nature of the CDF (monotone curve) compared to that of the histogram which would instead require to encode every bin separately.

As noted above, the present invention provides a technique and apparatus for decoding data, which is applicable in particular to transmitting and storing image and video data. The present invention is particularly advantageous when used in combination with techniques for encoding a sparse 2D array into a data stream and recreating a sparse 2D array from an encoded data stream.

Such a technique can take advantage of the sparseness of a 2D array of data to be decoded and/or encoded, that is the relative amount of zeros in the expected array and the way those zero values are grouped within the array. Similarly these techniques are beneficial where the frequently occurring values are of any predetermined value, instead of zero, but are identical and grouped together.

Typically the data can be of any nature as long as the values can be mapped into a 2D array, although the techniques are also applicable to linear data and most beneficial for image reconstruction. In the case of a picture or video, the data could be values associated with a colour space (e.g., the value of a red component in an RGB colour space, or the value of a Y component in a YUV colour space, etc.), or alternatively the data could be residual data (whether transformed or not) or metadata used to decode a bytestream. Residuals are further defined in the present application, but in general residuals refer to a difference between a value of a reference array and an actual array of data.

It should be noted that techniques described in the following examples are agnostic as to the meaning or use of the decoded array. Rather the concept of decoding a sparse array from an encoded bytestream is discussed, for example. Of course, the data set may be used to reconstruct a larger dataset by combining multiple decoded data sets. Once recreated the data may represent any information which has been compressed, such as an image or sonogram. As will be understood from the following described examples, encoding and decoding techniques wherein a quantity of data to be compressed and transmitted or stored by way of a scheme involving encoding the data in a hierarchy of data structures, preferably containing sparsified data, from which the original data can be reconstructed are especially suitable for use with the invention.

A dataset that has been processed in accordance with the following examples may be compressed by way of entropy encoding, and decoded by decoding the output bytestream with the inverse coding process used by the encoder, based upon an entropy function representing the statistical distribution of values taken by the elements of the data structures. It will be recognised that the banding of the statistics data as described earlier in this disclosure provides a further advantageous increase in efficiency.

A plurality of individual datasets may combine to reconstruct a larger dataset and the dimensions of the individual data sets within the larger array may be chosen according to an optimal size for processing of each data set in parallel. For example, using OpenCL terminology, the work-item for each dataset may be made more efficient by limiting the dimensions of the sub-datasets.

The following examples relate to an illustrative example of de-sparsifying and decoding a specific sparse array. In particular, the description shows how processes of de-sparsification and decoding can interact with each other. Although the description refers to a specific example, the skilled person would readily understand the general principles behind it and how the process can be applied more generally to de-sparsifying and decoding data.

FIG. 8 illustrates an example of a recreated sparse 2D array 100 which will be used throughout the present description. This array is the recreated array which is encoded in an example bytestream. As can be seen, the array contains a large amount of zeros and small clusters of non-zero values, as symbols.

The technique of this example takes advantage of the sparseness or consistency of the data by not sending or implicitly signalling quadrants (or blocks) where the array is sparse (or consistent) and thus achieves compression gains. Moreover, since the decoder does not need to store significant data in memory or monitor for defined symbols, decoder efficiency can be improved.

If no data is sent for quadrants in the array, there are introduced of course significant challenges at the decoder. The following sets out a technique by which a decoder may recreate a 2D array of sparse data where much of the sparse data has not been received, while any non-zero values are accurately located within the array, efficiently. In particular, the specific structure used to encode and/or decode the data together with the order used to decode said structure enables the technique to minimise the amount of information needed to be received by the decoder, thus optimising decoding and reducing the amount of data to be transmitted. Moreover the data structure and implementation provides for efficient implementation in terms of both processing capability and speed and memory usage.

During the process of decoding, an ordered tree is built. Code symbols from the bytestream are converted to decoded symbols and attached to nodes of the tree. The invention introduces a special symbol which is used by the decoder to build the tree. We refer to this special symbol here as a node symbol. The node symbol indicates to the decoder how to build the tree. Within the node symbol is information which tells the decoder how to map the information from the bytestream to the tree and what it can expect in the bytestream. Using a specific traversal order, the decoder maps the nodes symbols to the tree and can subsequently map the data received in the bytestream to leaves of the tree in the correct locations. The spatial information or the order of the original information is then contained within the tree. The mapping of the node symbols and traversal leaves blank spaces in the tree which can be simulated or inferred to indicate that a predetermined value was in that location in the original information but was not sent in the bytestream.

Within the bytestream, the node symbols are interspersed. That is, the node symbols and data symbols occur between or amongst one another within the bytestream and the different symbols can also be thought of as distributed or dispersed among each other within the bytestream. A feature of the bytestream is that the decoder cannot know the order of node symbols and data symbols prior to the decoding process. Thus there is no set or predetermined ordering to the interspersal of the symbols. The location of the data symbols is deduced from the information contained within the node symbols. The node symbols and data symbols may not occur within the bytestream one by one or regularly but rather will be present within the bytestream irregularly, but not randomly.

Figure 9A:
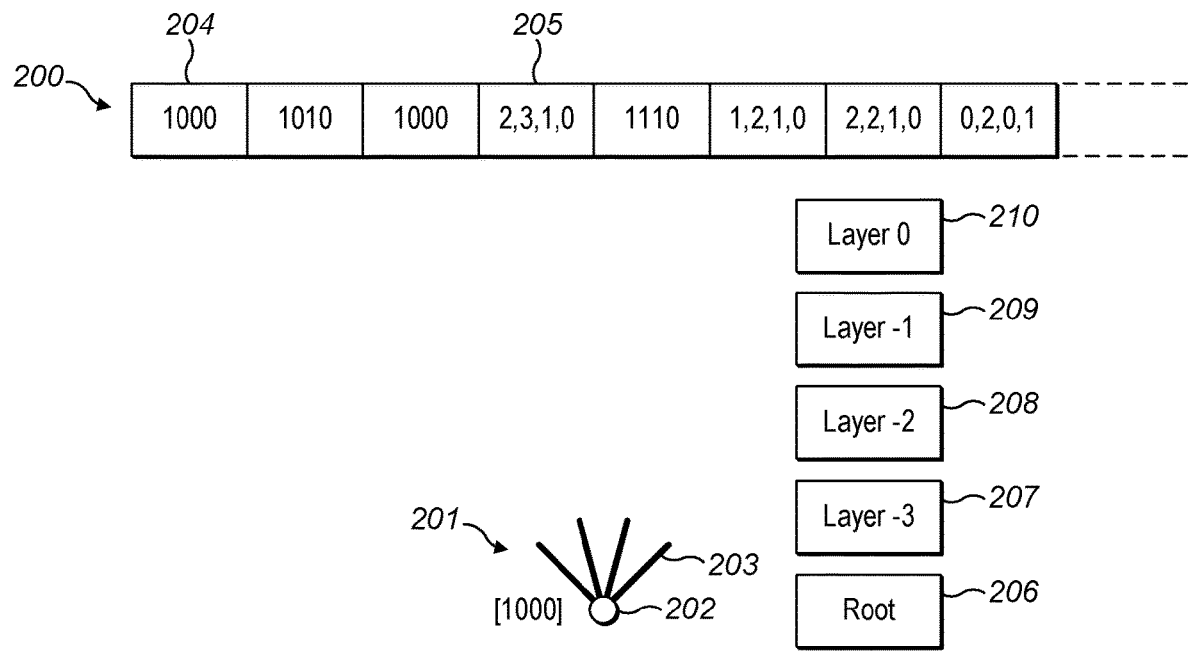
FIG. 9a illustrates a logical representation of a bytestream and an intermediate stage of processing an ordered tree.
Figure 9B:
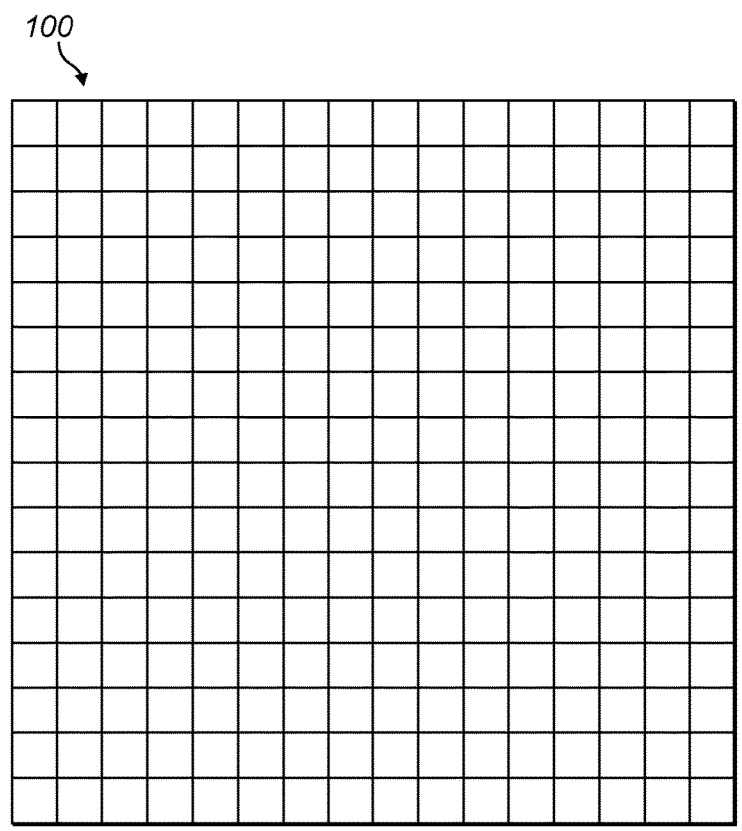

The following elaborates on the process in more detail. With reference to FIG. 9a, the technique first reads the stream 200 to identify a first symbol. The figures in general, and FIG. 9a for example, show a representation of the received bytestream 200. As will be understood, the representation 200 is not truly a bytestream but rather a logical representation. For the purposes of this description, we assume the decoder knows or otherwise has identified the stream length from a wider bytestream along with other metadata and we consider only a specific, simple encoded dataset. The logical representation is separated into bytes or nibbles. The logical representation is a series of four-bit values or nibbles, each representing a T-Node Symbol 204 (node symbols), and a series of four symbols 205 (data symbols) each representing a value and a node in the Top Layer, or Layer 0. This will become clear from the below as the process of decoding the data is explained.

The decoder begins by building a tree 201. A tree is a well-known data structure in computer science. In particular the tree is an ordered tree, that is, the tree is a rooted tree in which the order of the subtrees is significant. The exemplary tree 201 is a quadtree composed of nodes and edges that connect the nodes 202, however binary trees, octrees and other trees may be utilised depending on the information to be compressed. A parent node is connected to a child node by an edge. In a quadtree, each parent node has exactly four child nodes. A quadtree can contain a number of leaf nodes. A leaf node is defined as a node containing no children and may alternatively be referred to as an outer-node, or terminal node. A root node is defined as a node without a parent. Nodes containing both parents and children are referred to as inner-nodes.

The present example technique defines a data structure called a sparse quadtree. In the sparse quadtree, each parent node has either exactly four child nodes, or no children.

As mentioned above, once the tree is built, the Top Layer 210 of the tree, or the final layer, includes the data values of the array 100. The order in which the data values are included in the tree represents the spatial information of the array. In the present example, since we are illustrating the concepts using a quadtree to recreate a 16×16 grid of data, there are four layers and a root in the tree giving 256 possible leaves, each representing a value in the 16×16 grid. As mentioned, other sized grids may utilise different ordered trees.

During decoding, the tree 201 is traversed in a generally bottom to top definition; that is, the tree 201 is generally traversed from the lowest level to the highest level. The tree is generally traversed as greedily from low to high as possible interleaved with minimal backtracking to scan over the breadth. In an embodiment, the tree is traversed in a depth-first pre-order manner. This allows for spatial information to be utilised as part of the encoding and decoding process. It further ensures that the elements are decoded in the same order that they are encoded. In further embodiments, other traversal methods could be employed to utilise further aspects of the structure of the tile such as breadth-first, in-order or post-order. What is essential is that the same traversal is used in the decoding as the encoding to ensure that spatial information is retained. Thus, the sparse quadtree data structure defines the instances and location of data.

The data in the bytestream 200 may either be a node symbol 204 or a data symbol 205. The node symbol 204 is a series of binary values or flags that indicate to the decoder if a particular branch in the tree 201 has an expected child where the branch has an expected child if there is a data node included in the data set for the Top Layer descendants of that branch. That is, the bytestream contains information on the existence of a child node or not. If not, it can be assumed that all descendant leaves from that node are the same, predetermined value (in the example the value is zero). \Mien the decoder traverses the tree to reach a leaf (a node in the Top Layer), the bytestream 200 contains a series of four data symbols 205, each representing a value of the leaf of the tree. The tree can be subsequently mapped to a grid using a defined order with each leaf on the tree corresponding to a location in the grid. In this way the spatial information of the grid is inherent or predetermined by the structure of the tree and is not signalled.

As indicated above, the node symbols and data symbols are interspersed within the bytestream. As the decoder parses the bytestream and builds the tree, it can assign the data symbols identified to a data location within the tree. By building the tree with a predetermined traversal, the decoder can anticipate whether the next symbol in the stream will be a data symbol or a node symbol.

If the surface was less than 16×16 (for a tree with 5 layers) the decoder could at some stages anticipate that "what would for a 16×16 surface be anticipated as the next symbol" has been omitted from the bytestream and hence anticipate a different next node or data symbol. For example, only node symbols and data symbols that are in the signalled area may be transmitted, thus preventing the sending and receiving of certain node symbols and data symbols. Similarly, certain bits of a node symbol may be set as any value but may not be treated as real values corresponding to areas of the array during decoding. The signalled region/volume may also include every node whose node symbol has a mixture of masked and non-masked bits, as will be described below.

When reaching the Top Layer, the bytestream will preferably include all four data symbols for a branch, even if the data symbol corresponds to the predetermined value, i.e zero for a sparse tree. That is, the data symbols are explicitly encoded for all nodes in the outer layer or lowest level of abstraction. \Mien this is considered in the grid representation, all values in the smallest blocks are sent when at least one of the values of the block is non-zero. Optionally, the node symbol that corresponds to the penultimate layer in the tree is not sent but rather is implicitly assumed by the decoder. Since in this scenario the data symbols are explicitly sent, it will be understood that the node symbols in this layer would be understood to include a set of positive flags (or [1111] as will become clear from the description below). Note that the value may not be positive but may be a masked value.

Another way of looking at this implicit signalling feature is that a node symbol is sent or included within the bytestream only if a grandchild node exists for the visited node of the tree. In other words, a node symbol shall have a grandchild node. The quantity of code-less layers (currently 1) could be alterable.

At the decoder, since it knows not to expect a node symbol for this layer, the decoder can assume the symbol to be retrieved is a data symbol when this node is visited in the traversal and can build the branches of the tree accordingly.

It has been identified that such a combination of implicit node symbols signalling and explicit data symbol signalling achieves optimal efficiency whilst minimising memory storage. Since the node symbol for the layer is not sent in the bytestream but rather all data symbols in the outer layer are sent, then overall this achieves efficiency gains in practice where it is statistically likely that non-zero values are clustered or grouped together within an overall data set.

In the art, there is no consideration of the effect on the subsequent stages of encoding after sparsification. According to the present disclosure, sparsity can be ignored where this makes sense to help the entropy encoder avoid encoding rare symbols. Also, the invention optionally allows a dense quadtree, by arrangement, if there is too little sparsity to justify the node symbols (which will become implicit [1111]s).

In the figures the stage of building the tree is illustrated in the Figures labelled a and the knowledge the process has of the gild is illustrated in the Figures labelled as b. Thus in FIG. 9a, the process knows that the tree 201 has a root 202 and since it is a quadtree is has four branches 203. The process cannot yet deduce any information to map to the gild 100 of 2b.

As shown in FIG. 9a, the reconstructed tree structure has a set of layers. A layer is considered to be the subset of nodes that have the same Distance from the root. The Distance is the minimum number of Branches (or edges) between two nodes. The number of layers is set by the size of the array which is to be reconstructed. This size may be either predetermined or may be signalled in the bytestream.

Where combining multiple datasets, the number of layers corresponds to the dimensions of the grid and so may be set to optimise parallel processing, that is, that each work-item is made optimally efficient.

The example considers a quadtree but the nodes may have any number of children. The tree may accordingly be referred to as an n-Tree, a tree where no node has more than n Children. That is, a quadtree is an n-Tree where n is 4. A quadtree is well known in the art and is a tree data structure in which each internal node has exactly four children except leaf nodes and all leaves are on the same level, the level corresponding to the locations in the grid. The data can be stored compactly in an array as an implicit data structure.

In the example described, the tree has four layers 207, 208, 209, 210 and a root 206 which reconstructs a tree for a 16×16 grid. That is, the Rise is 4. The Rise is the absolute value of the Altitude of the Root of an n-Tree. It corresponds to the number of Layers in the n-Tree excluding the Root. The Altitude is an index, −j, increasing with Distance from Root, reaching 0 at maximum Distance from Root. Note: −j is always 0. In other words, the Number of Layers in an n-Tree corresponds to Rise plus 1.

For completeness, a node at Altitude −j−1 is a Parent of a node at Altitude −j, where both nodes are linked together by only one Branch and a node at Altitude −j+1 is a Child of a node at Altitude −j, where both nodes are linked together by only one Branch (or edge). A node at Altitude −j+x is a Descendant of a node at Altitude −j, where x is the Distance between the two nodes and a node at Altitude −j−x is an Ancestor of a node at Altitude −j, where x is the Distance between the two nodes.

The decoder begins to build the tree 201 once it has read the bytestream. At this stage, the grid 100 is empty as shown. The decoder knows that the tree 201 must have a root node 202 and simulates four branches 203 from that root node 202 as the decoder knows that the tree 201 is a quadtree (or 4-tree). Thus the root 202 and the first four branches 203 are known or assumed.

Where we describe the steps of simulation, it will be obvious to the skilled person that these steps are for illustration only and can be implemented by the skilled person in different ways or orders.

The tree can be traversed in any known manner. The example here utilises a depth-first approach, specifically a Depth-First Pre-Order Traversal. A Depth-First Pre-Order Traversal can be considered to be a strategy for traversing an Ordered Tree from least to greatest Altitude. If a Leaf is reached, the strategy backtracks through Ancestors of that Leaf, before traversing further sections of the same Tree.

In other words, the tree is deepened as much as possible on each child before going to the next sibling. In context, the decoder will start from the Root 206 of the tree and proceed towards Layer 0 210, the Top Layer, as far as possible before retreating to the next sibling in the previous Layer. The decoder will repeatedly retreat after all siblings in that layer have been visited until a Depth-First Pre-Order Traversal of that grid has been completed.

Returning to the example of FIG. 9a, the first 4-bit value 204 of the stream 200 is taken. In this example, the value is 1000. This value may be referred to as a T-node symbol. A Label is data attached to a node in a Tree other than what is implicit in the Tree's structure and order of nodes. The T-node symbol informs the decoder of the data in the stream and tells the decoder how to reconstruct the tree 201.

In the 4-bit value of the stream, the T-Node Symbol, a "1" indicates that the Child of the node is an expected child, that is, there will be data sent in the stream representing the Children of that node—or, alternatively, a "1" indicates that the Child node will have itself children, and therefore it will be present. On the other hand, a "0" indicates that the Child of the node is not expected, that is, no data will be sent in the stream for those nodes and no child is expected to be received for that branch—or, alternatively, a "0" indicates that the Child node will not have itself children, and therefore it will not be present. The decoder can assume that all the leaves from those latter branches are zero values. This will optionally be simulated and is described below.

At the end of the branches 203 of the root node 201, the decoder now knows that there is a node having further children for which data will be received in the stream and three nodes for which no further data was or will be sent.

Figure 10A:
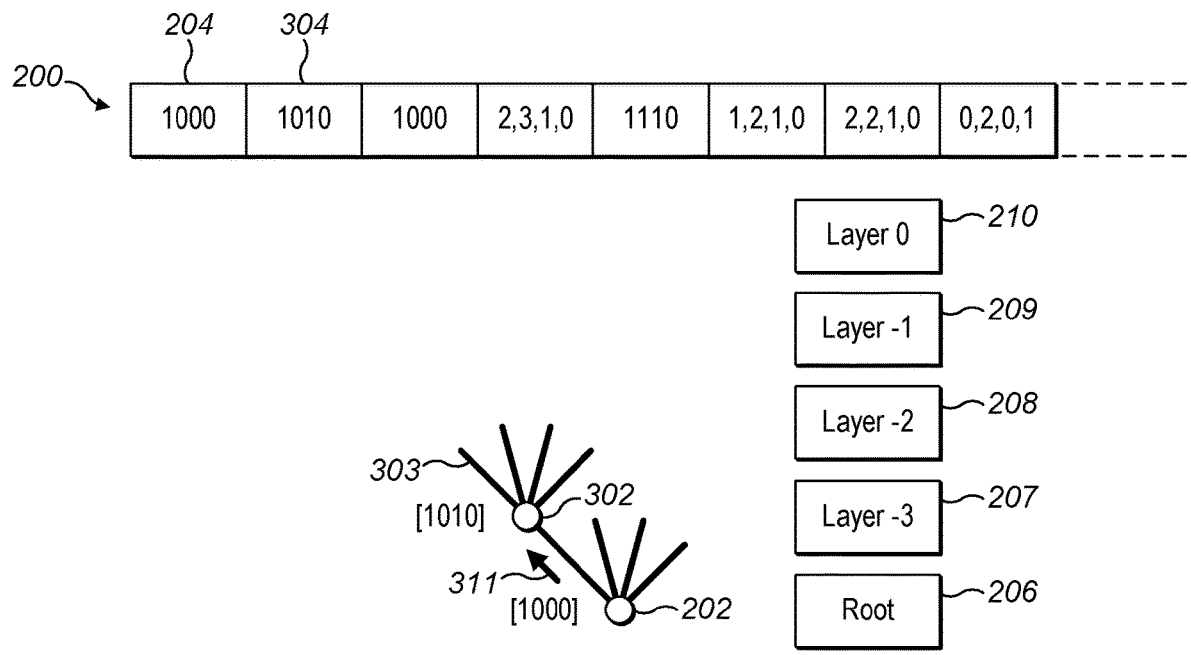
FIG. 10a illustrates a logical representation of a bytestream and an intermediate stage of processing an ordered tree.
Figure 10B:
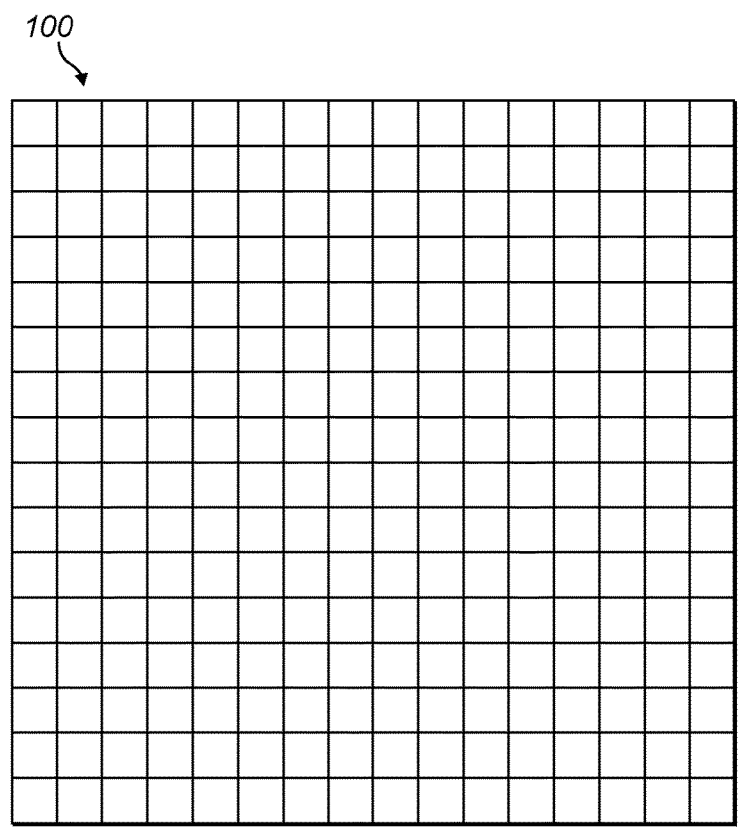

In the depth-first pre-order traversal order and referring to FIG. 10a, the process moves to the left-most node 302. There was a 1 received in the stream for this branch in the T-Node Symbol 204. It will be recalled that the T-node symbol 204 indicates that further data will be received, the next 4-bit value 304 of the stream is taken. In this example, the value is 1010. The decoder simulates the 4 branches of that node 302, as shown. Again, no information in the grid 100 of 3b can be deduced.

Figure 11A:
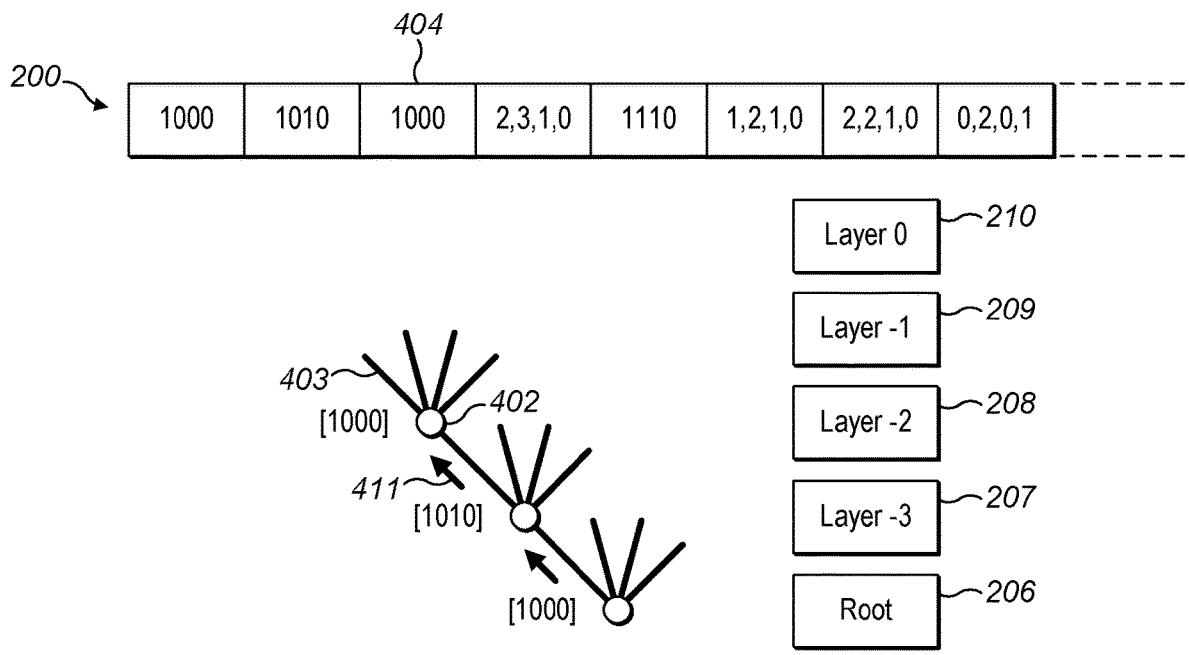
FIG. 11a illustrates a logical representation of a bytestream and an intermediate stage of processing an ordered tree.
Figure 11B:
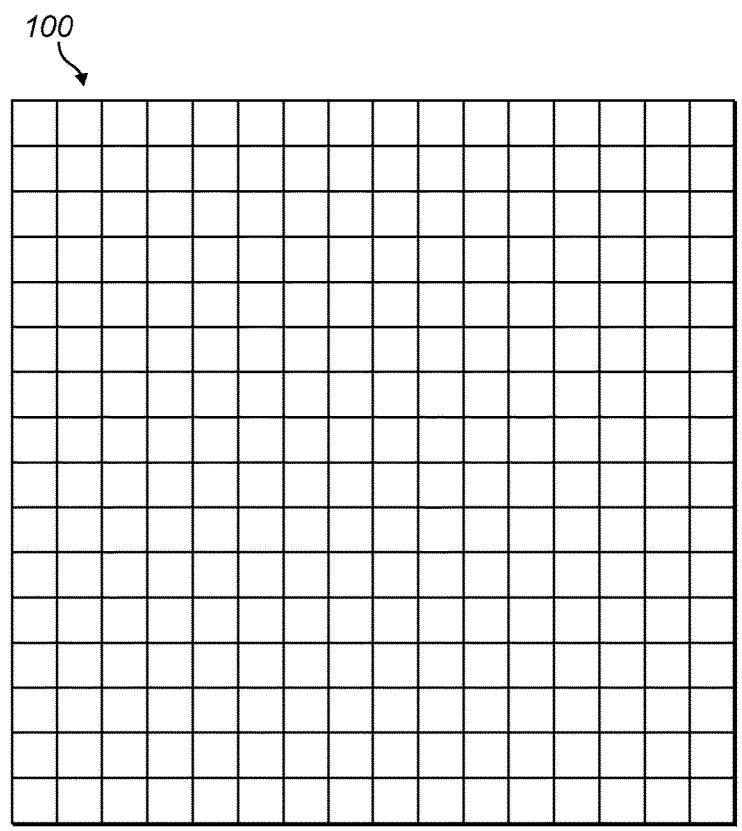

Arrow 311 shows the traversal as will be explained in more detail below. The left-most branch 303 is traversed and since the first value of the T-node symbol 302 is '1' the decoder looks to the next 4-bit value. The decoder is now in Layer-2 208 as shown in FIG. 11a. As shown, the data retrieved next 404 is 1000 signifying that further data will be received for the leftmost branch 403 but no further data will be sent for the three remaining branches. Again, no information in the grid 100 of FIG. 11b can be deduced and arrow 411 illustrates the traversal.

The decoder has now populated the root and the left-most part of the Layers-3 207 and -2 208 from the left-most node of Layer-2 208, as shown in FIG. 11a. Moving to FIG. 12a, since the decoder has reached Layer-1, it now expects 4 data symbols. It is noted that all values in Layer 0 are sent if the decoder reaches that level even if the actual value is zero (for a sparse array or alternatively the same as the predetermined value) and thus no symbol is signalled for Layer-1 209 since this will always be known and no symbol is attached to the node 512 of this Layer.

The decoder now takes the data symbols from the stream to populate the tree in the nodes 513 of the Top Layer. In the example the symbols or values are '2', '3', '1' and '0' and the decoder populates the tree as shown in the Figure. In the example traversal order, the tree is populated with the symbols from left to right and each Leaf in Layer 0 (the Top Layer) is known. The four data symbols can be considered as part of a Label recalling that a Label is data attached to a node of the tree. Again 511 shows the traversal order.

Rather than send the node symbol of Layer-1, which in this example would be [1110] (only if you chose to send the pre-determined value of the $4^{th}$ symbol implicitly) since the fourth data symbol in this quadrant is a 0, the preferred implementation instead includes all data values for this quadrant in the bytestream directly, even if the value is a zero (or the predetermined value). In other words, all sibling data values are sent where at least one sibling is non-zero. In this way the Layer-1 node symbol need not be sent. It has been shown that the implicit signalling of the node symbol for Layer-1 and the explicit signalling of all values for each 2×2 block containing a non-zero value is more efficient than sending non-zero values only and signalling their location in the bytestream.

If for example the tree was a binary tree, instead of encoding and sending the penultimate layer, the bytestream instead would include both data values where at least one of two neighbouring data values is non-zero.

Once the data symbol has been retrieved, in a preferred implementation the tree beneath that data symbol can be trashed to the extent it is no longer needed. In this way, efficient use of memory resources can be achieved as the interspersed data symbols result in the entire structure of the grid not being needed in order to accurately identify or place the data values.

The following is a summary of the present example:
1) the first T-Node Symbol of the bytestream (1000) corresponds to the T-Node Symbol of the Root Layer;
2) the second T-Node Symbol of the bytestream (1010) corresponds to the T-Node Symbol of Layer-3;
3) the third T-Node Symbol of the bytestream (1000) corresponds to the T-Node Symbol of Layer-2;
4) there is no T-Node sent for Layer-1 because the T-Node of Layer-1 would always be (1111), and therefore it is implicitly present once the T-Node Symbol of Layer-2 has indicated there is a child node and data symbols for that branch;
5) The values in the Label correspond to Layer 0 and are "attached" to the branches of Layer-1.

For further clarification, within a data structure there are five layers (wherein a layer is a set of nodes), from the Root Layer to Layer 0. Each Layer is associated with a set of data. In the case of the Root Layer, Layer-3, and Layer-2, this set of data is called a 'T-Node Symbol' or node symbol (these terms may be used interchangeably) and effectively indicates whether the four children node from a specific layer will have children (in which case it is a logical value of "1") or no children (in which case it is a logical value of "0"). Where there are no children, this indicates that no data symbols exist in the Top Layer for that branch of the tree. Layer 0 is a special layer in that it contains leaves, i.e. nodes with no children, and in particular includes the data symbols in those leaves.

In the bytestream, there will be node symbols for the Root Layer, Layer-3 and Layer-2. Due to the way that node symbols work and their meaning (as described in this application), and the fact that Layer 0 is the "final" layer, node symbols for Layer-1 is implicitly sent, since the node symbols in Layer-2 would have already implicitly indicated whether or not the child node of Layer-2 (i.e., Layer-1) has children. Given that the children could only be the data symbols in Layer 0 (residuals or metadata for example), then the bytestream would only simply directly indicate Layer 0 data symbols. Note we have a maximum of 21 node symbols for each data structure (one for the root, up to four for Layer-3, and up to 16 for Layer-2).

From a nomenclature point of view, the term "Label" may refer to: (a) a node symbols for Root Layer or Layer-3 (e.g., in the present figures these would be data blocks [1000] and [1010]) (b) the "group" of Layer-2 and the data symbols of Layer 0 (e.g., in the present figures, these would be either the third and fourth data block in the bytestream, i.e. [1000] and {2,3,1,0} or the last four data blocks in the bytestream, i.e., [1110], {1,2,1,0}, {2,2,1,0} and {0,2,0,1}) and (c) each individual data symbol in Layer 0 (e.g., in the present figures, each one of data blocks {2,3,1,0}, {1,2,1,0}, {2,2,1,0} and {0,2,0,1}).

Figure 12A:
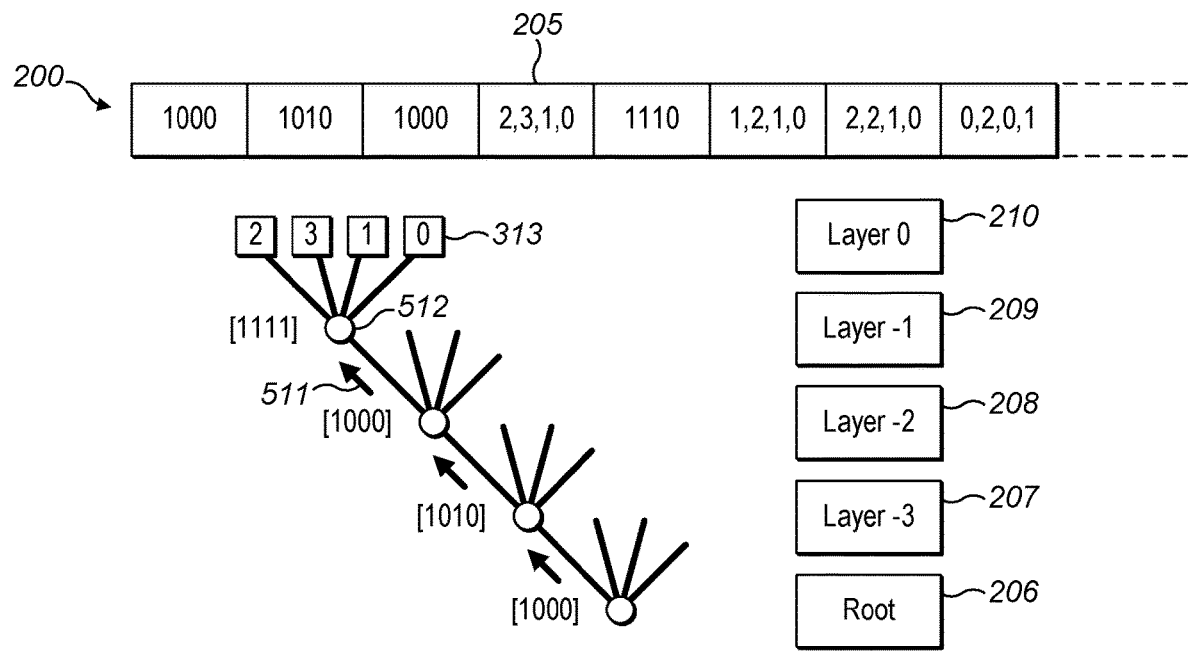
FIG. 12a illustrates a logical representation of a bytestream and an intermediate stage of processing an ordered tree.
Figure 12B:
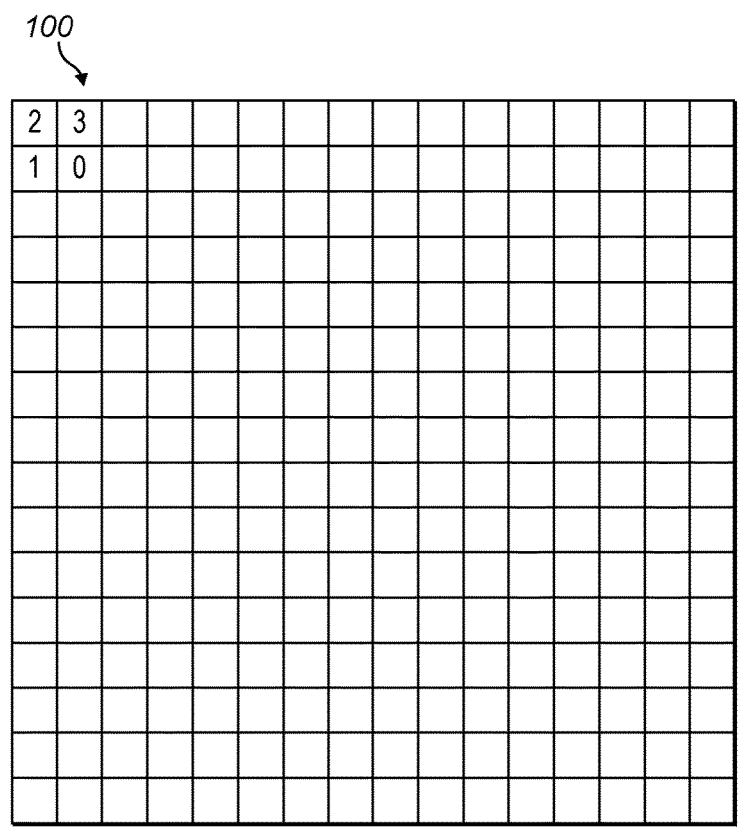

We now have values which can be mapped to the grid 100 as shown in FIG. 12b. Whether the grid is populated as the tree is populated or after is unimportant but we populate the grid here when the data is placed into the tree for illustrative purposes. As above, the tree can be mapped using spatial information inherent to the data structure. In practice, the process may wait until the entire tree is populated.

Each data symbol or value is referred to in the examples as a discrete value however in preferred embodiments the value in the array is a differentially encoded value which is relative to another symbol in the data set. In other words, differences may be relative to the values for the previous non-sparsified element, apart from values in the first non-sparsified element of a grid, which are absolute. For example, if the first value is 4 and the second value is 5, the first value retrieved will be a 4 and the second value will be a 1, which is the difference between the first value and the second value. As will be understood the difference values can be translated into real values before the mapping or as a part of the mapping.

As shown in FIG. 12b, the 16×16 grid 100 of decoded values can be populated by the symbols received. A grid is a fully populated, dense, rectangular 2D array. The four symbols represent a 2×2 block in the upper left of the grid.

In the example, the 2×2 block is ordered: top-left, top-right, bottom-left, bottom-right. As will be understood, in practice this order may be any order provided the encoder and decoder are in agreement.

The values in the stream shall be interleaved in the example in depth-first order, which corresponds to z-order in image space. The z-order is defined recursively in the examples but of course this may be any order, as will be understood. Z-order is an ordering of overlapping two-dimensional objects. In the example, the data of the tree is mapped to the grid in a Morton ordering. A Morton ordering maps multidimensional data to one dimension while preserving locality of the data points. It was introduced in 1966 by G. M. Morton. The Morton order for the example is sub-partitioned into 2×2 blocks. The terms Z-order, Lebesgue curve, Morton order or Morton code are used in the art.

Morton ordering is well known in the art and will be understood. It will also be understood that any suitable mapping of the data from the tree into the grid may be utilised.

In practice Morton ordering using 2×2 blocks means that the symbols of the tree are mapped to the grid in the following example order for an 8×8 grid:

| 0  | 1  | 4  | 5  | 16 | 17 | 20 | 21 |
|----|----|----|----|----|----|----|----|
| 2  | 3  | 6  | 7  | 18 | 19 | 22 | 23 |
| 8  | 9  | 12 | 13 | 24 | 25 | 28 | 29 |
| 10 | 11 | 14 | 15 | 26 | 27 | 30 | 31 |
| 32 | 33 | 36 | 37 | 48 | 49 | 52 | 53 |
| 34 | 35 | 38 | 39 | 50 | 51 | 54 | 55 |
| 40 | 41 | 44 | 45 | 56 | 57 | 60 | 61 |
| 42 | 43 | 46 | 47 | 58 | 59 | 62 | 63 |

Figure 13:
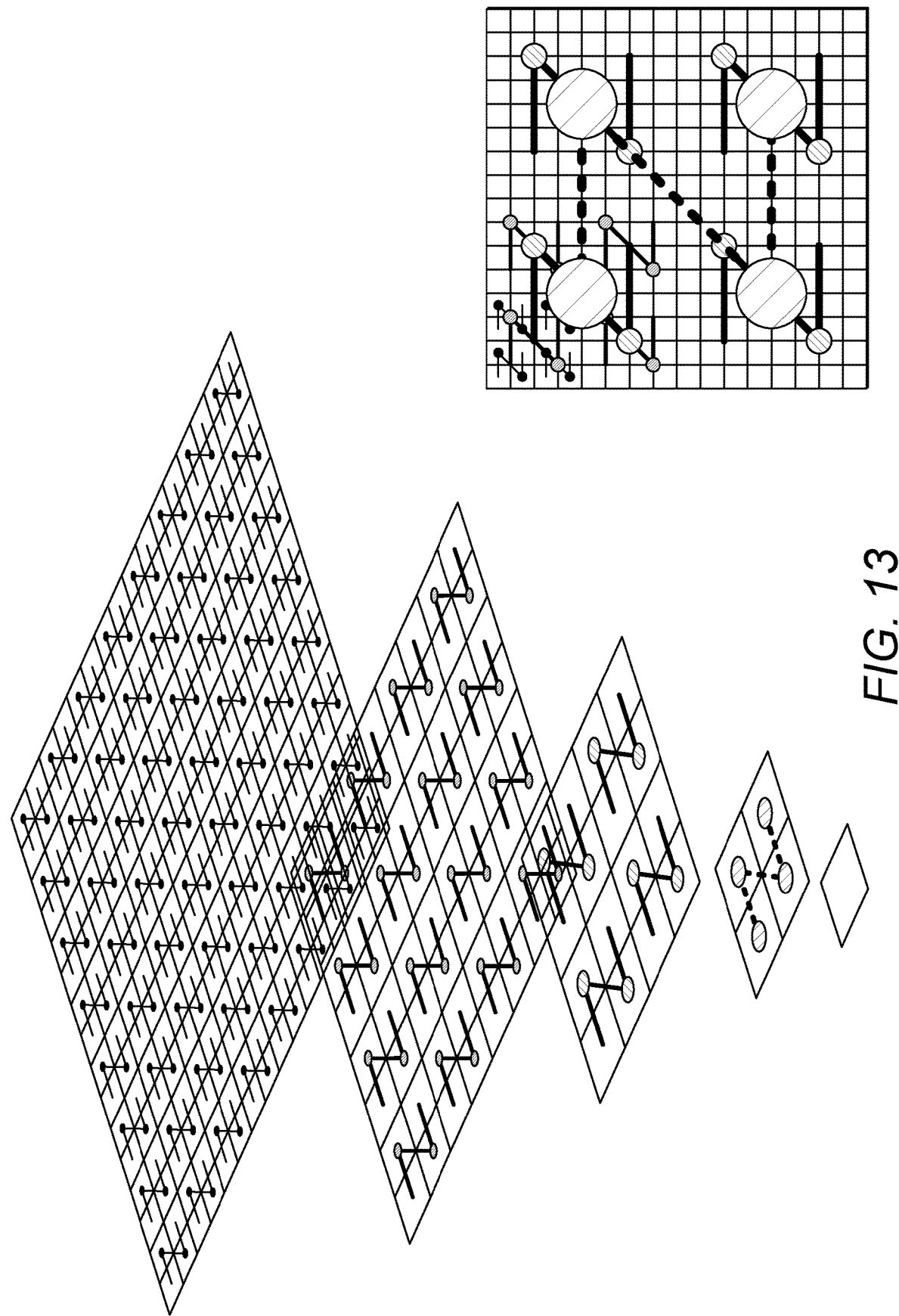
FIG. 13 shows representation of a Morton order mapping of the ordered tree to a grid.

When considering the mapping of the tree to the grid, it can be considered that the z-order mapping results in each branch of the tree being a quadrant of the grid. The Layer-1 branches each being a 2×2 block, the Layer-2 branches each being a 4×4 block and the Layer-3 branches each being an 8×8 block (the Root representing the 16×16 grid). The Morton ordering and depth-first pre-order traversal are illustrated figuratively in FIG. 13.

While a Morton ordering is a preferred ordering, it is also contemplated that other orders such as a Hilbert space-filling curve, also known as a Hilbert pattern or Hilbert curve, may be used which may provide implementation or efficiency gains depending on the array to be compressed and the likely locations of non-zero elements in the array. In certain circumstances the Hilbert curve ordering will also have better locality preserving behaviour.

Figure 14A:
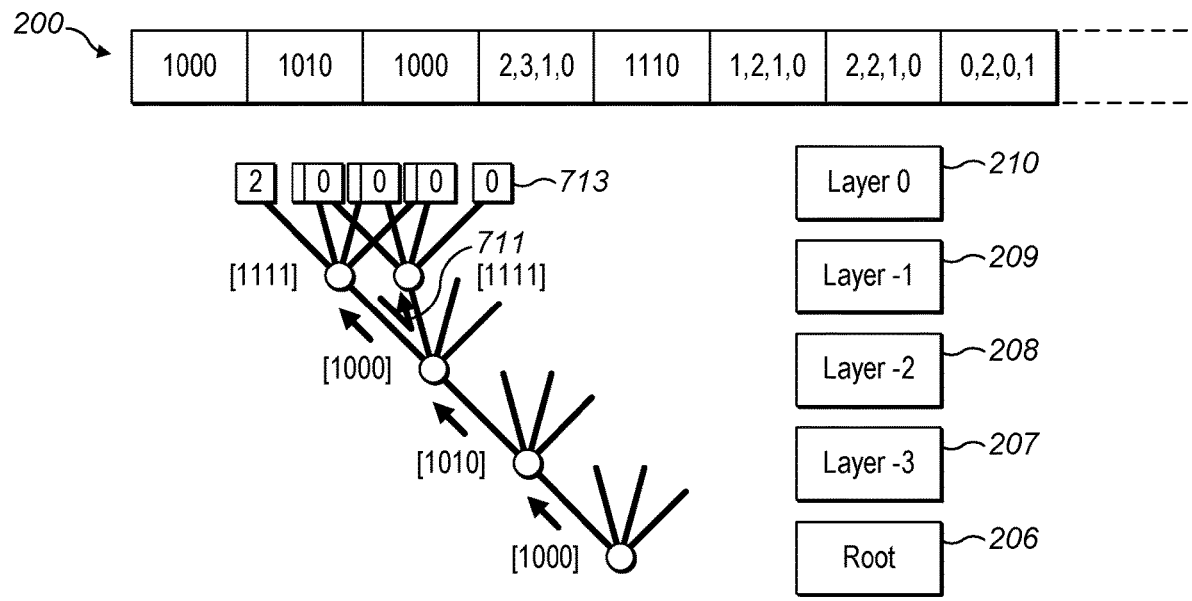
FIG. 14a illustrates a logical representation of a bytestream and an intermediate stage of processing an ordered tree.

With reference to FIGS. 12a and 12b, it can be seen that the first four symbols have been decoded and mapped. Following the traversal order, the decoder decodes the tree, as shown in FIG. 14a. Arrow 711 shows the traversal order. Since the data previously received for Layer-2 indicated a 0 value for this node, the decoder is able to simulate or infer the sparse portion of the tree and map zero values to the grid. Where a 0 is received in the T-node symbol, the 0 indicates that no data will be sent for that node. If no data is to be sent, the decoder assumes the value is zero.

The present context assumes that the grid is sparse and so assumes a zero value where no data is sent. Of course it will be readily understood that any value could be used as the value that is not sent. For example, the value not sent could be any value or a 1.

Figure 14B:
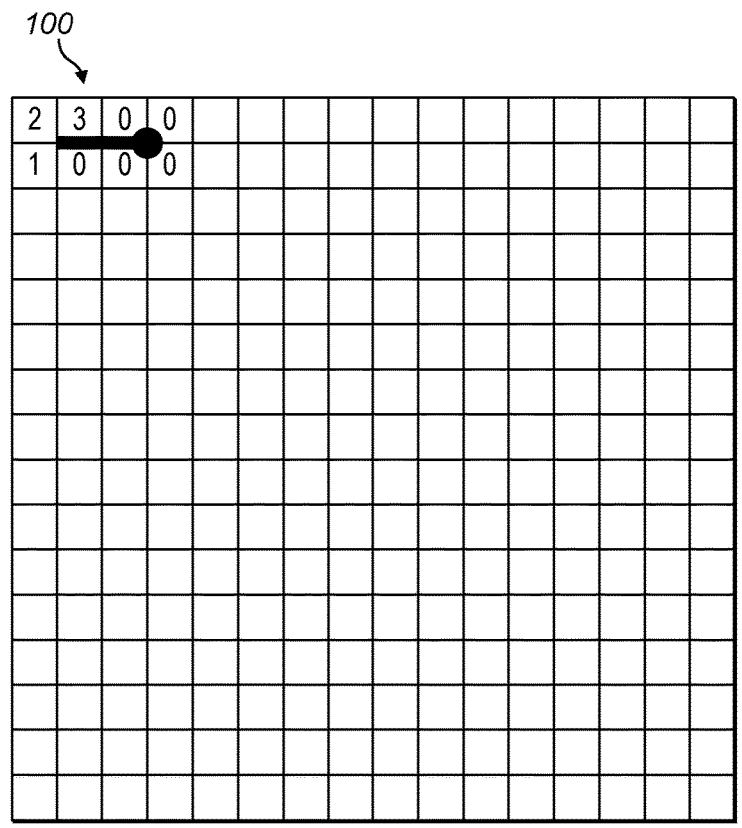

As shown in FIG. 14a, the process assumes that the values 713 in the Top Layer 210 are zero and simulates the tree. The zero values can then also be mapped onto the grid 100 following the z-order mapping as shown in FIG. 14b. The four zero values are mapped to the 2×2 block to the right of the 2×2 block previously mapped.

While we describe a process of simulation here it will be understood that the traversal can instead be terminated for that branch and the grid populated using the inferred values without having to simulate the tree as the values will be indicated by the termination of the traversal. However, we describe simulation here as an implementation option which allows for clearer presentation of the technical concepts.

Figure 15A:
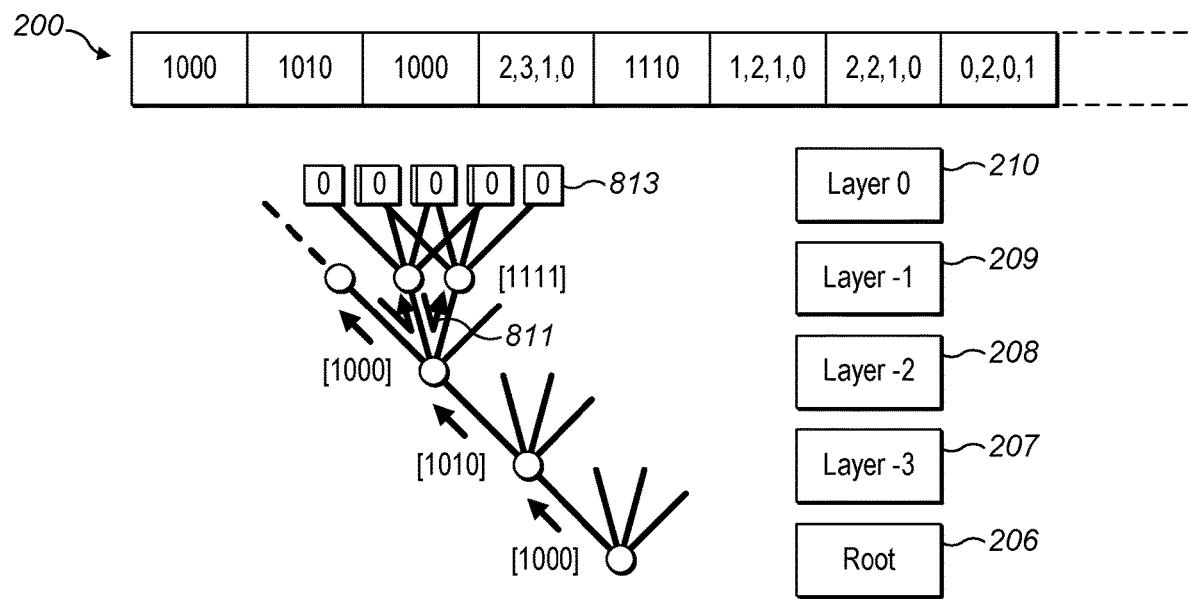
FIG. 15a illustrates a logical representation of a bytestream and an intermediate stage of processing an ordered tree.
Figure 15B:
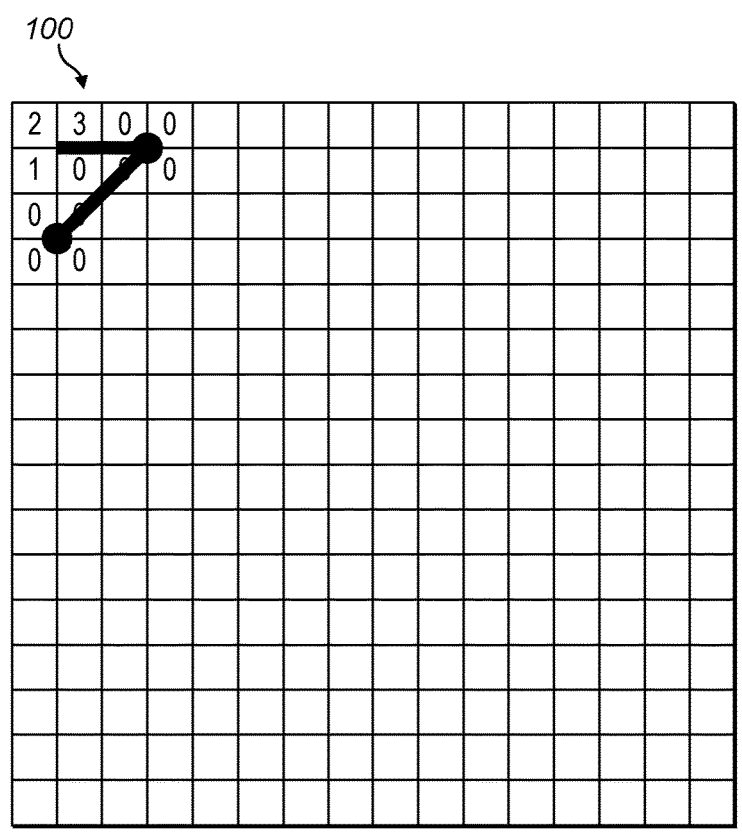

The simulation process continues as shown in FIG. 15a. In this figure the leftmost branch of the tree is redacted for clarity of presentation. The previously parsed node symbol indicated that the next node in the traversal 811 terminates. Therefore, the decoder can simulate that the leaves 813 of this node are sparse in Layer 0. The zero symbols can be mapped to the grid according to the z-order mapping. As shown in FIG. 15b, a block of 2×2 zero values are entered beneath the first block placed, that is, at the bottom-left of the 4×4 quadrant.

Figure 16A:
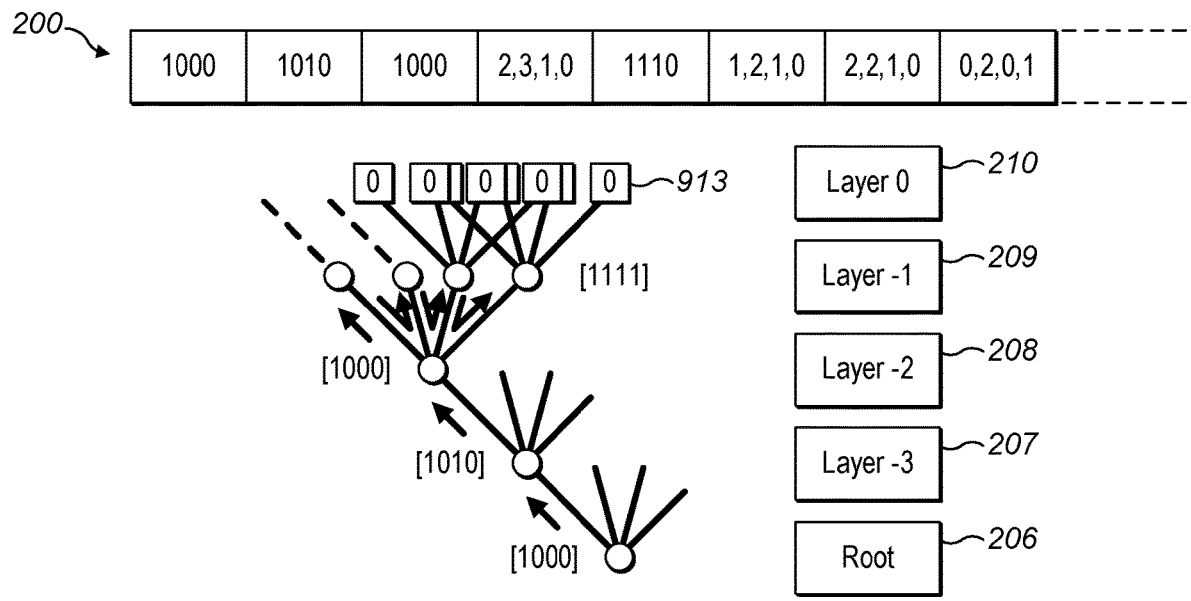
FIG. 16a illustrates a logical representation of a bytestream and an intermediate stage of processing an ordered tree.
Figure 16B:
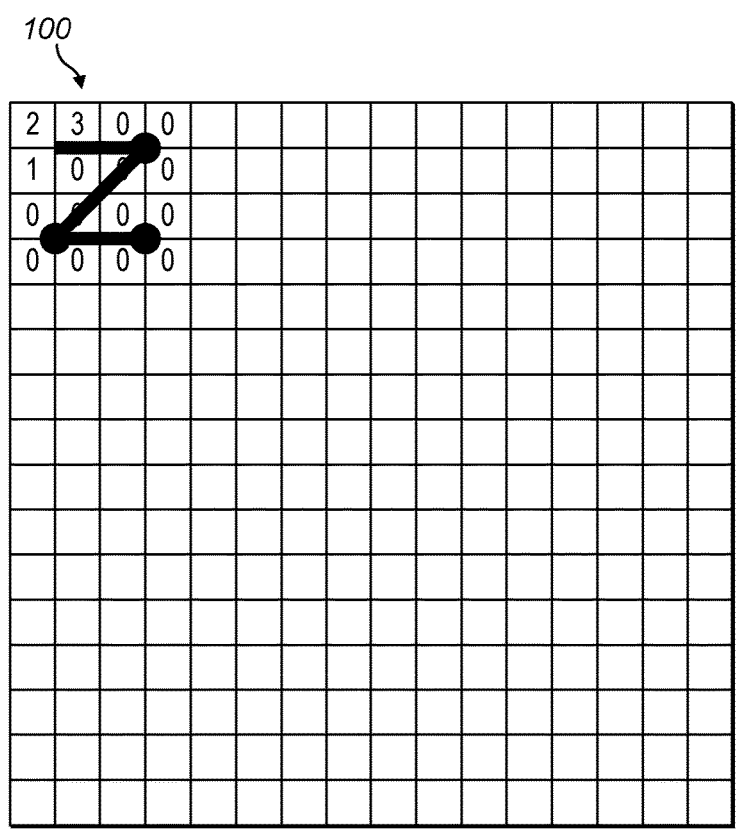

The quadrant in the grid 100 is completed by simulating the final leaves 913 of that node. As the node symbol for that node indicated 1000, the sparse values can be simulated as shown in FIG. 16a. The zero values are mapped to the final 2×2 block of the 4×4 quadrant according to the z-order, as illustrated in FIG. 16b. The 2×2 block of zero values is entered as the bottom-right block of the quadrant. The process now has a complete quadrant. In practice, the simulation may be done in one single step for each of the Layers (e.g., all the nodes associated with the zero node symbols in that Layer are simulated simultaneously and the corresponding zeros are mapped in the grid). The simulation can be a notional process, i.e. done implicitly rather than explicitly.

Figure 17A:
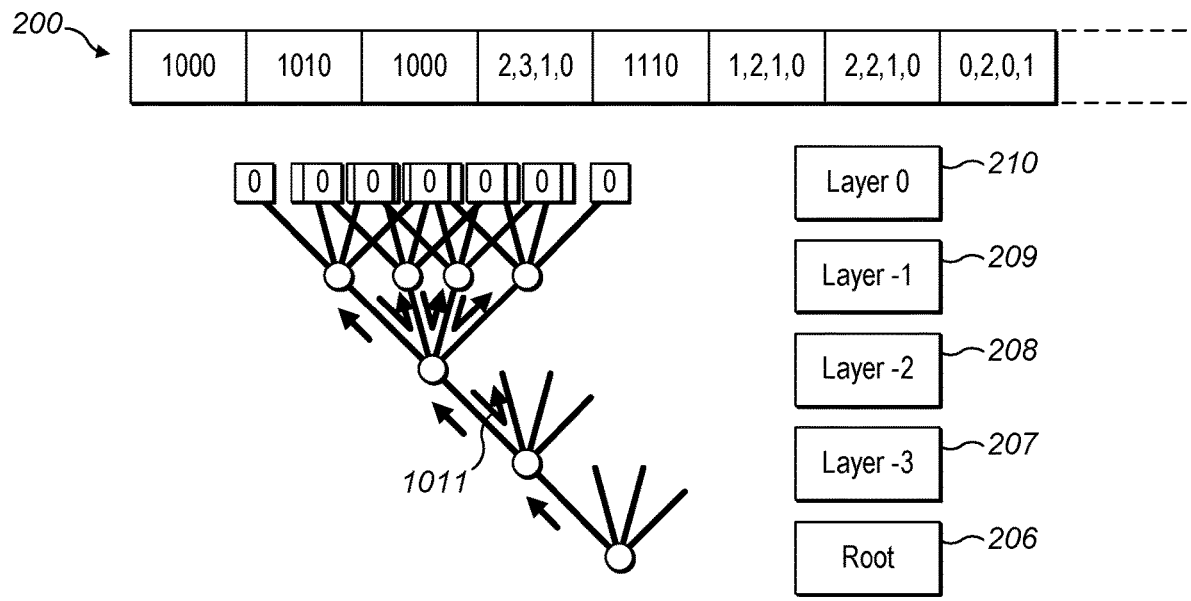
FIG. 17a illustrates a logical representation of a bytestream and an intermediate stage of processing an ordered tree.
Figure 17B:
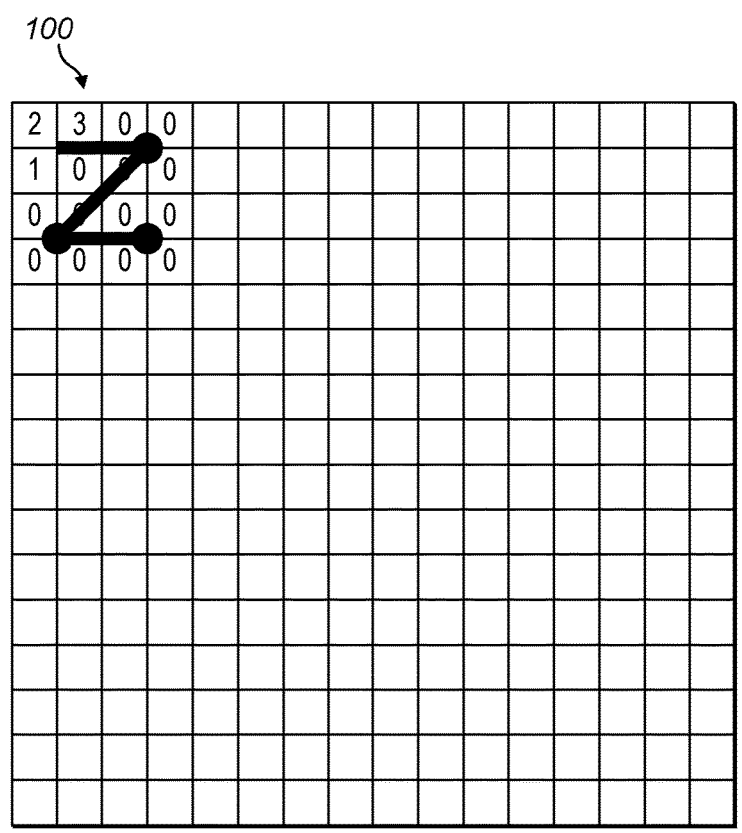

FIG. 17a illustrates the depth-first pre-order traversal. The arrows 1011 indicate how the process traverses the tree to consider the next node. The process descends the tree now it has populated all branches from the previous node. The process then continues to the sibling. Sibling Nodes are nodes having same Altitude and same Parent. As all the leaves have been populated, the next node to consider is the sibling in Layer-2.

Figure 18A:
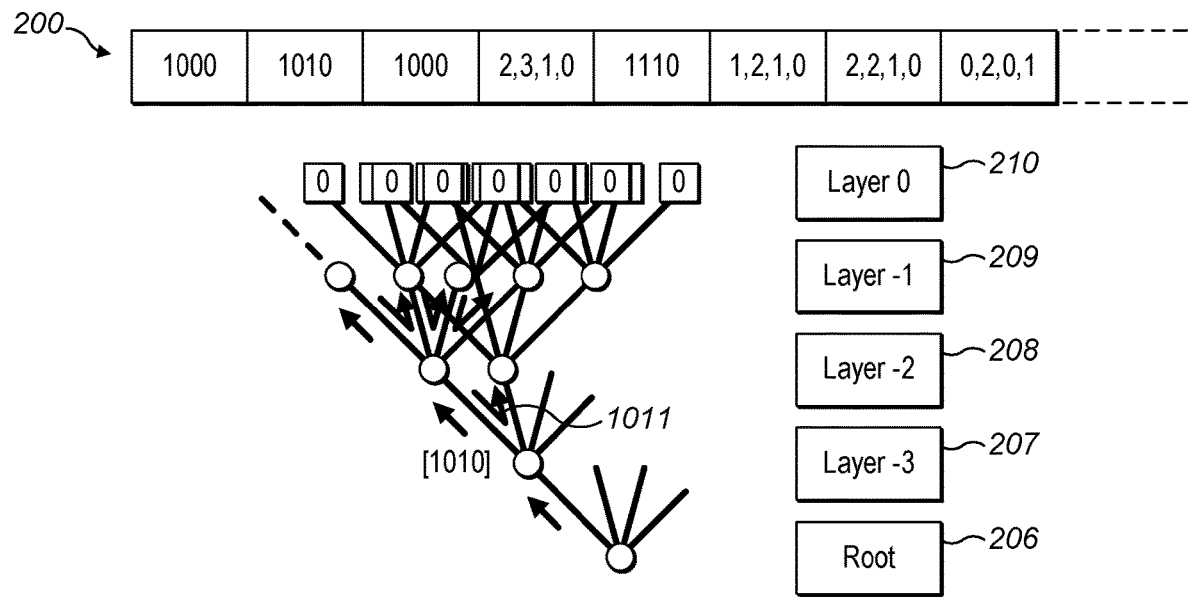
FIG. 18a illustrates a logical representation of a bytestream and an intermediate stage of processing an ordered tree.
Figure 18B:
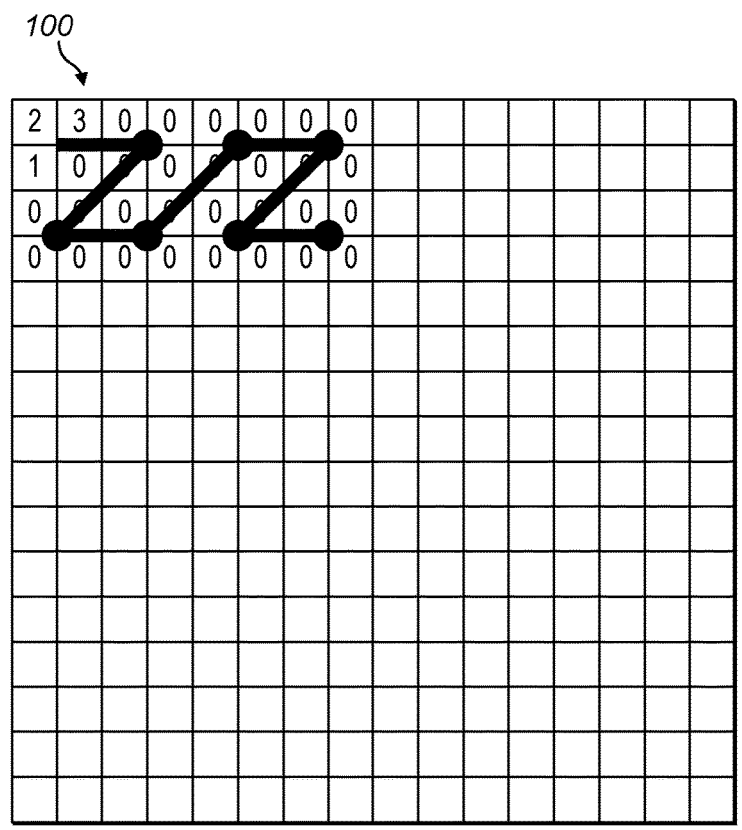

Referring to FIG. 18a, it will be recalled that the node symbol for the parent was 1010. Accordingly, since the node symbol associated with the second branch is zero, the process does not expect to receive any data in the stream for this branch, that is, the sibling. Accordingly, all leaves from this node can be simulated as zero values, that is all values in Layer 0 from this node are zero values. In other words, all values in this quadrant are zero. Once the tree is simulated, the values can be mapped on the gild. As shown in FIG. 18b, following the z-order, the 4×4 block in the top-right of the quadrant can all be mapped as zero values.

Figure 19A:
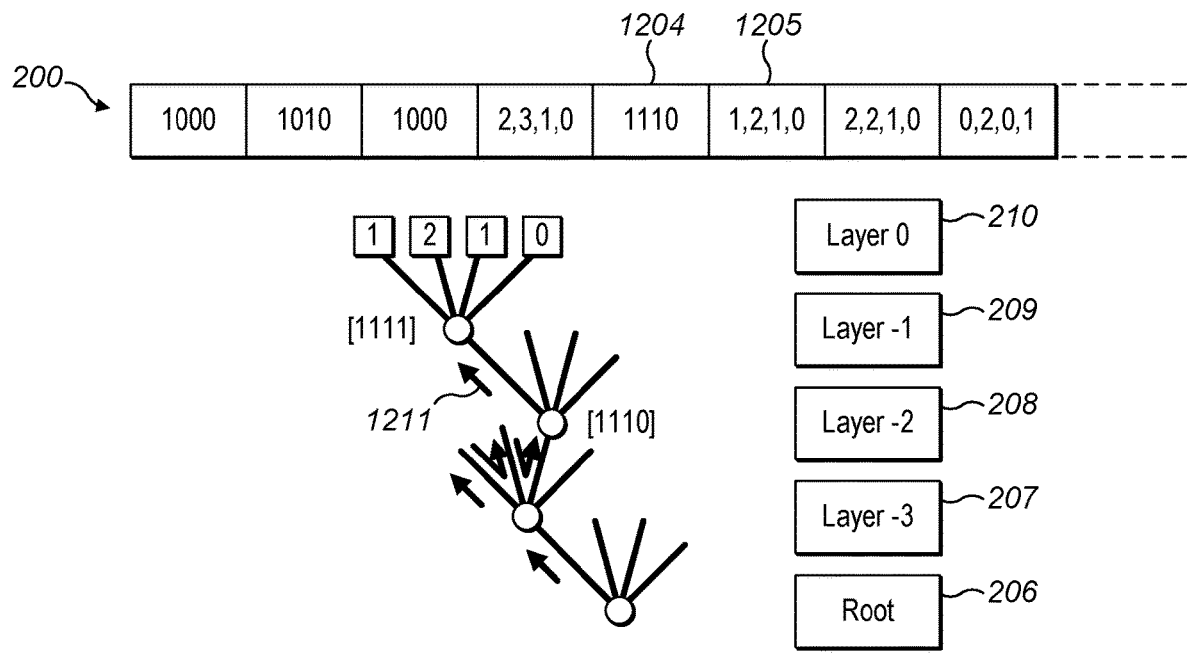
FIG. 19a illustrates a logical representation of a bytestream and an intermediate stage of processing an ordered tree.
Figure 19B:
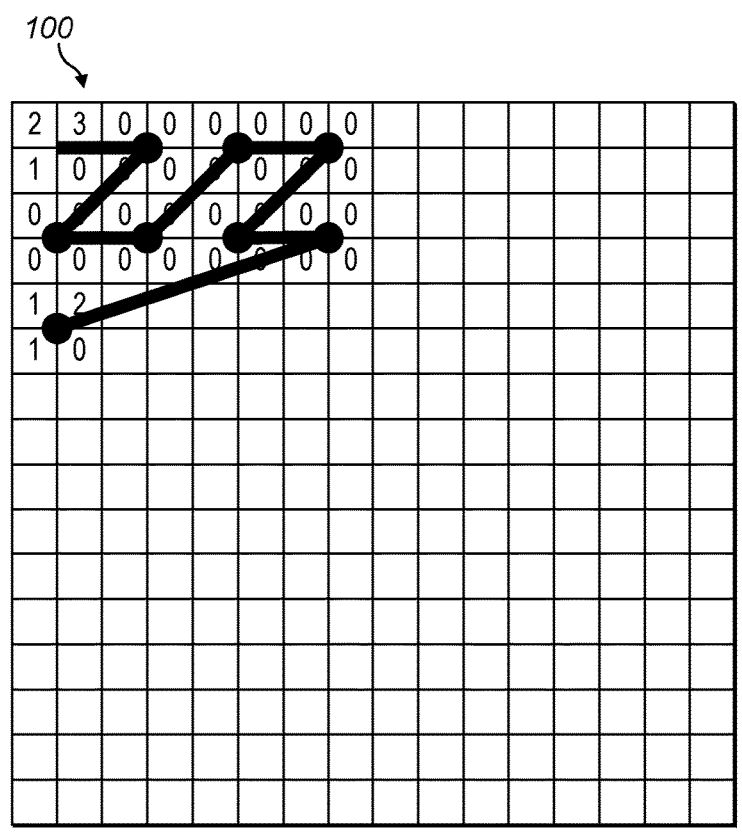

Traversing the tree, the next sibling was indicated by the node symbol as having data in the stream (the corresponding Node Symbol was 1). Accordingly, the process retrieves the next node symbol 1204 from the stream. As shown in FIG. 19a and reconstructed in FIG. 19b, in this example the next node symbol is 1110. This node symbol indicates that three of the nodes in Layer-1, that is three of the Children from the node in Layer-2, have nodes which contain non-zero values. The final node contains only zero values. In FIG. 19a, certain nodes and branches have been redacted and arrow 1211 indicates the traversal.

The process continues in a similar manner and the symbols are retrieved from the bytestream, the tree is built using the symbols as the leaves in Layer 0 and the symbols are mapped to the grid according to the z-order mapping. For brevity, the next steps are not illustrated. For the final sibling of this node, no data is retrieved from the stream as a 0 was indicated in the T-node symbol. The process simulates the tree with zero values as the leaves in Layer 0 from this node. The zeros are mapped to the grid to complete the quadrant. The final sibling from the node in Layer-2 was indicated using the node symbol as being sparse and the process populates the tree with zero values for all leaves descended from that node. The zeros are mapped to the grid with zero values for that 4×4 block in the quadrant.

The traversal now ascends to the next parent node in Layer-3 following the traversal order. Since the first node symbol retrieved from the stream for the root node indicated that this branch does not have a node symbol in the stream, it can be inferred that all leaves in Layer 0 which are descended from this branch, the second branch from the root, are zero values.

The process accordingly reconstructs a dense tree while simulating zero values for all leaves in this sub-tree. The zeros are mapped to the gild. The 8×8 quadrant is all represented by zeros. This 8×8 quadrant may be referred to as a sparsified area. A sparsified area is an area of a gild containing zeroes that are not encoded in the stream but are known to be zeroes by default. Zeroes outside the sparsified areas are decoded from node symbols in the same fashion as non-zeroes.

Each branch of the tree may be simulated and each leaf is populated with a zero in turn. However, the linear steps are not essential and the process may intelligently identify that all leaves are zero and map the zeros to the grid accordingly, in one step.

The same process is followed for all siblings for the root as indicated by the original root node symbol. The grid is now completed with the final two 8×8 quadrants being mapped with the zero values from the tree.

Once the process is terminated and all the simulations are made, the decoding process has effectively reconstructed a dense counterpart of the sparse tree received. That is, a tree where every node above Root Layer of the original n-Tree has n children and every Layer is dense.

Figure 20:
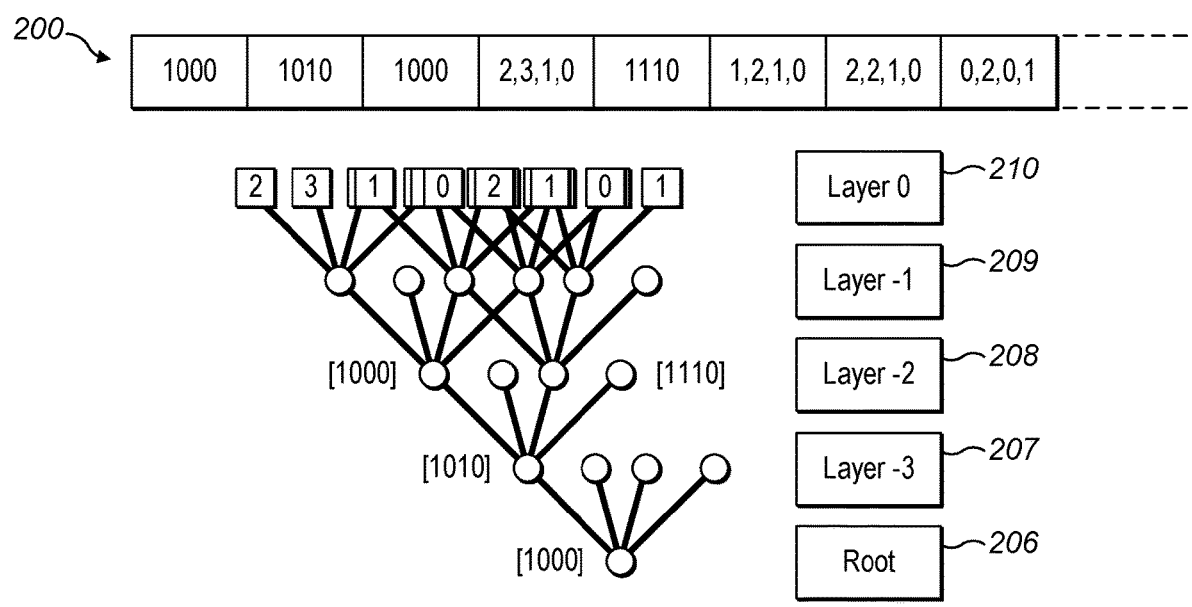
FIG. 20 illustrates a logical representation of a bytestream and summary of processing an ordered tree.

FIG. 20 illustrates a summary and it is recalled that FIG. 8 is the recreated array. 16 leaves are shown with corresponding T-node symbols. 16 symbols (or Labels) have been received in the bytestream. 240 zeros have been encoded "implicitly" as the T-node symbols for the nodes and the decoding and de-sparsification process resulted in an indication that the areas were sparsified. In the received tree derived from the bytestream, there are 7 nodes without descendant nodes. Children of these nodes are optionally simulated in the process to derive a dense tree. The tree is mapped to the grid where the 16 non-zero values are located accurately in the 2D array, while the sparse areas of zeros are placed within the grid without the data being sent in the bytestream.

By using the tree structure, the node symbols (which tell the process which branch will have children and which will have no children) and the depth traversal order, the process can reconstruct a fully sparsified grid by sending only a small set of information. As indicated above, the performance of the decoder is improved as it can be made more efficient. The process maps a constructed tree onto a grid. The grid may contain a sparsified area, that is, an area of a gild containing zeroes that are not encoded in the stream but are known to be zeroes by default. Zeroes outside the Sparsified Areas are decoded from node symbols in the same fashion as non-zeroes.

Figure 21:
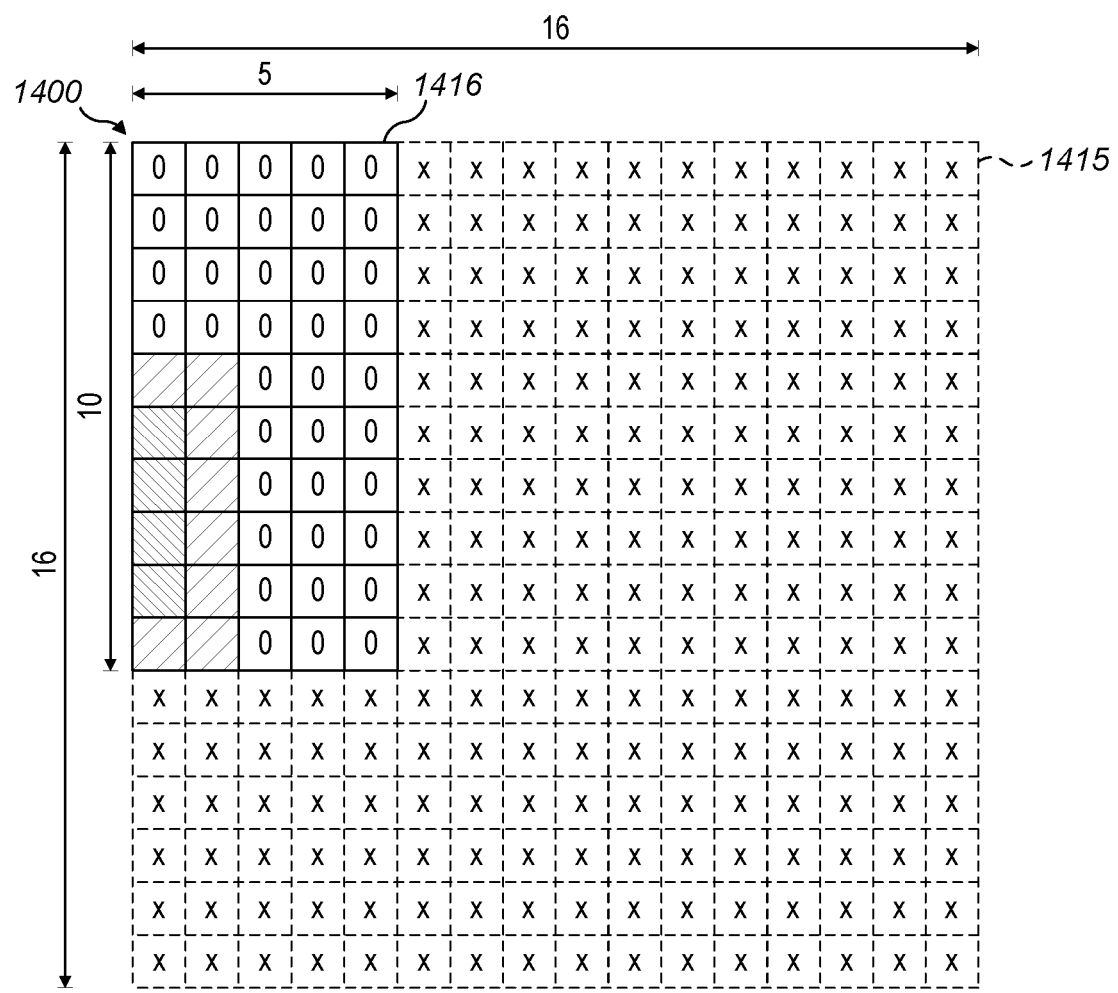
FIG. 21 illustrates a rectangular 2D grid with an inactive region.

The above example considers a square grid, in particular a 16×16 grid where there are 5 layers of the tree and therefore 256 nodes. In the case of a rectangular grid 1400 with a 16 by 16 square grid shown dotted, as illustrated in FIG. 21, there may be masked bits which indicate that sections of the tree are irrelevant and not considered. The tree is still ordered but may no longer be a full quadtree as part of the tree may not be completed. The signalled part of the tree is considered the active volume. If there are 0 or 4 children then the tree may be full, optionally the tree may not be full.

If the signalled part of the tree was an annulus and the decoder was set up for decoding annular videos (e.g. from a spaceship that couldn't see anything in the direction of the sun) then the quadtree would have a particular and anticipatable active volume to determine masking. An implementation of the proposed techniques in a decoder could move the annulus around from frame to frame in line under the control of a pre-determined algorithm. Another example is still a rectangle, but with broken pixels in the camera, which is a very common problem. In a further example there may be areas of useless pixels after a period of degradation.

The example of FIG. 21 shows an active volume 1416 of 5×10 contained within a grid of 16×16. The masked portion of the grid 1415 is signalled with an 'x'. The size of the active volume may be signalled using metadata in the bytestream. The decoder will ignore any part of a node symbol that corresponds to a block which is outside the signalled active volume. Therefore those bits of the node symbols can be any value and are typically chosen by the decoder to optimise entropy. Optionally, the bits of the node symbol may not be transmitted. For example, in FIG. 21, the top right 8×8 block and bottom right 8×8 block are both outside the active volume. Therefore, the first node symbol of the bytestream (to be associated with the root of the tree) would be 1×1x. That is the second and fourth bits of the node symbol can be any value. When building the tree, the decoder will ignore the second and fourth bits as it knows they exist outside of the active volume it has been told separately. When encountering a masked bit or a bit of the node symbol that corresponds to an non-signalled or masked area, the processing of the tree will terminate for that branch, i.e. the traversal will terminate for that branch and carry on to the next node in the order.

It has been described above how the node symbols may signify sections of an array which are sparse or contain a common predetermined value. Optionally, in order to improve the encoding of previous or subsequent encoding stages, it is also considered possible for the common or predetermined values to be explicitly signalled as data symbols with a corresponding positive flag being set in the node symbol. That is, despite the area being sparse, the values may still be explicitly signalled in the bytestream with the node symbol being set accordingly in the bytestream (and tree) for the decoder to properly decode and spatially locate that value. Such selective sparsification may provide benefits where the sparse, or common, value is a cheap value to signify or where such artificial modification of the data stream may provide for improved entropy encoding in a subsequent entropy encoding stage in the encoding chain. The selective sparsification may be set automatically by analysing a predicted bytestream, machine learning, statistical analysis, or through iterative trial and error.

The above description gave an example of how a sparse tree of the invention can be used in the compress of a two dimensional grid however it was also mentioned that the invention could also be applicable to the compression of a linear grid or one dimensional array, below. The examples given are of one or two dimensions. In fact, the techniques can be applied to any numbers of dimensions and with n-Trees that are not 4-Trees. For example, using a 3D variant of Morton Order combined with an octree instead of a quadtree would allow volumetric imaging. As another example, one may show one dimensional de-sparsification with quadtrees but much the same could be done with binary trees i.e. 2-trees.

An example 1D array to be decoded has 50 elements, numbered from 0. This dimension information is assumed to be given in advance. It is known in advance that the default value of every element that is not explicitly decoded by the end of the algorithm is 0. The number of elements being explicitly decoded is not known in advance, except that it is guaranteed to be at least 1. Explicitly decoded elements may be non-zero or 0.

Figure 22:
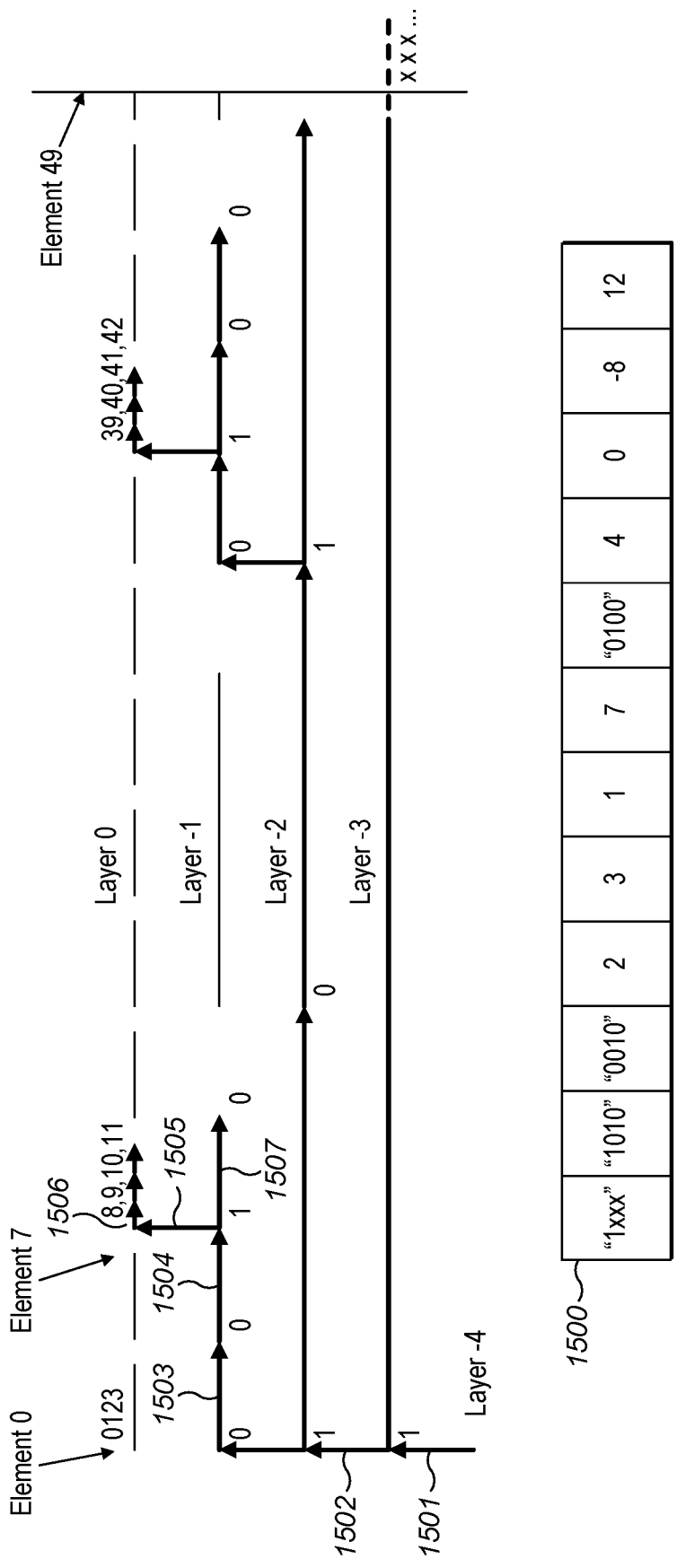
FIG. 22 illustrates a logical representation of a bytestream and a schematic flow of processing.

It is known in advance that the description of the data has five Layers, as shown in FIG. 22. The values in the symbols retrieved indicate how to navigate the layers of the tree. By following the annotations 0, 1 or x on the Figure, one is led to those elements in Layer 0 that are to be explicitly decoded. The meaning of these choices is:

1 means "Jump to the first node in a +1 deeper Layer" (deeper means in the direction of Layer 0)

0 means "Continue to next arrowhead in current Layer. If there is no further arrowhead, backtrack to −1 shallower Layer."

x means "Don't care if 0 or 1, but carry out the 1 actions"

Some digits of the-node symbols in FIG. 22 have been masked with an "x". This is connected with (4,3) being smaller than (16,16). Masked digits indicate that the corresponding child itself is inactive and automatically has zero children. The values of these masked digits play no role in decoding and can be optimized by an encoder to minimize entropy.

So, starting from the root or Layer-4 and following the logical bytestream 1500, the first symbol is a 1 which means jump to the first node in the deeper layer (step 1501). The next symbol is retrieved. Here, the first bit is a 1 and so we jump to the first node in the deeper layer (step 1502). The next symbol is retrieved. The first bit is a 0 and so we continue along the same layer (step 1503). Since we are in the Layer which indicates the data values, the first four elements of the 1D array are not explicitly signalled and are assumed to be of a predetermined value.

Again, a 0 is read next so we continue along the same layer (step 1504). The next bit is a 1 which indicates we should move to the deeper layer (step 1505). We have now reached the Layer in which we should retrieve data values. The data values are retrieved and placed at this location in the tree (step 1506). Following the traversal order we then ascend the tree once more and read the last bit of the symbol which in this case is 0 and so we continue (step 1507). Since we have reached the end of the symbol, we ascend the tree once more following the traversal order and continue the process.

Figure 23:
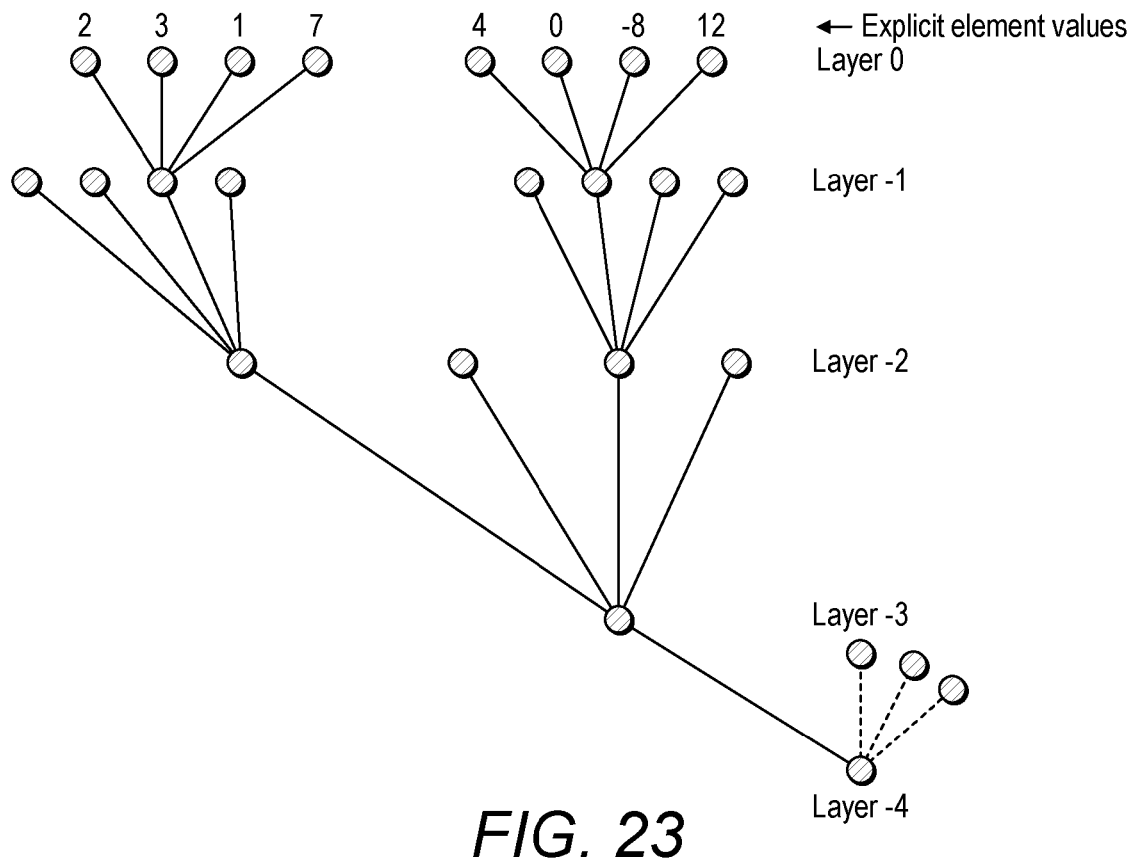
FIG. 23 illustrates an ordered tree after the processing illustrated in FIG. 22.

Once the bytestream has been followed, a tree as shown in FIG. 23 has been populated. The tree is an ordered 4-Tree, so Sibling nodes are ordered (in this figure the order is left to right) and only nodes in Layer 0 may have a Label. The Top Layer includes the explicit element values signalled in the bytestream. The three right hand nodes in Layer-3 are inactive because array length of 50 elements is less than 65. The annotation of x in the Layer-3 symbol indicates that the value of this bit is irrelevant and could be any value because it is ignored. The process is only concerned with the first 50 symbols as we know this is the length of the array. Even if all 50 elements were explicit these nodes would remain childless. This example explicitly codes elements in positions 8, 9, 10, 11 of the 1D array, for example. The explicit elements have explicit values 2, 3, 1, 7 and 4, 0, 8, 12 respectively, as shown by the Labels on the relevant nodes.

The decoding order commences with three node symbols, followed by 4 data values, followed by another node symbol. It is not known whether the following symbol will be a node symbol or a data symbol or value until the previous node symbols have been decoded.

The present invention permits the above described process of decoding received data to be performed in a parallel manner. In particular, the procedure illustrated at FIGS. 9-20 may be executed in such a manner that a plurality of data structures within the stream 200 are processed in parallel, rather than in sequence. By obtaining offset values associated with subsets of the data set 200, the starting locations, or earliest element locations, of those subsets may be identified. This means that subsets that occur later in the stream and correspond to higher tiers, that is tiers more distant from the root tier 206, may be processed as soon as their locations are known, rather than when their locations have been determined by way of having processing the subsets preceding them in the stream.

It has been described above how a bytestream may be constructed and decoded to incorporate a set of interspersed node symbols and data symbols. Once the symbols have been output they may be subsequently entropy encoded. The encoded stream may be entropy decoded before the set of symbols are processed. For example, the symbols may be divided into codes which are then encoded using a Huffman encoding and decoding operation. Alternatively, the stream of symbols may be encoded and decided using an arithmetic coding operation, such as a range encoding and decoding operation. These and other similar entropy coding techniques are well known in the art.

Entropy coding is a type of lossless coding to compress digital data by representing frequently occurring patterns with few bits and rarely occurring patterns with many bits. In broad terms, entropy coding techniques take an input codeword and output a variable-length codeword using the probability of the input codeword occurring in the data set. Therefore, the most common symbols use the shortest codes. The probability information is typically stored in metadata used by the decoder to recreate the input information from the output codeword.

The following describes a technique for entropy coding a bytestream. Immediately above we described how the process of decoding, once performed can then be applied to a process of de-sparsification to identify sparse areas of an array and accurately locate values in the array. The described operation couples the de-sparsification and decoding steps together.

Figure 24:
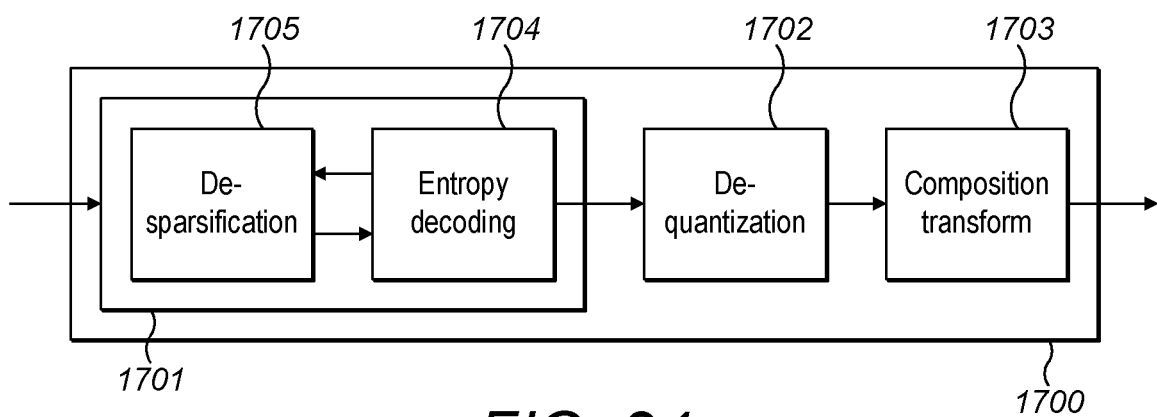
FIG. 24 illustrates an overview of coupled de-sparsification and decoding modules.

A high level overview 1700 is shown in FIG. 24. After the bytestream is decoded in a decoding operation 1701, an output plane of data undergoes a de-quantisation 1702 stage and a composition transform 1703 stage. The composition transform stage 1703 and de-quantisation stage 1702 are known in the art. For example the composition transform stage 1703 may include a directional transform of a plane as described in WO2013/171173 or a wavelet or discrete cosine transform.

It is described herein that the decoding operation 1701 may include two stages, that is, an entropy decoding stage 1704 and a de-sparsification stage 1705. The stages of the decoder are coupled together and are interrelated so as to efficiently identify the compressed information. The entropy decoding stage acts to decode a symbol from a stream of data. The de-sparsification stage acts to analyse the symbol and inform the entropy decoder what type of symbol is next to be decoded.

In preferred embodiments, the de-sparsification stage or module 1705 builds a tree as described above in the context of FIGS. 7 to 23. The de-sparsification stage receives a symbol from the entropy decoder and builds the tree. The de-sparsification stage then, from the process of building the tree informs the entropy decoder what type of symbol to expect next, i.e. a node symbol or a data symbol. By analysing the node symbols in the manner described, the de-sparsification stage can identify that the next symbol will be a node symbol or a data symbol by following the tree traversal and identifying that no data symbol is expected for a branch of the tree where the node symbol includes a flag indicating as such.

The terms de-sparsification stage, de-sparification module and de-sparsifier may be used interchangeable throughout the present description to refer to the functionality of the module. Similarly, the terms entropy decoding stage, entropy decoding module and entropy decoder may be used interchangeably to refer to the functionality of that module. It will of course be understood that the functionality may be provided by a combined module or multiple sub-modules.

At the entropy decoding stage, the module has access to multiple sets of metadata used to decode different types of symbols using the entropy decoding operation. First, the entropy decoding stage will first decode a symbol using a first set of metadata. The entropy decoding stage will then send that symbol to the de-sparsification stage. The entropy decoding stage will then wait to receive an indication of the type of symbol that is to be expected next. Based on the received indication, the entropy decoding stage will use a respective set of metadata according to the type of symbol expected in order to decode the next symbol using entropy decoding. In this way, different metadata can be used to decode a data set even when the data within the data set does not follow a predetermined pattern and the different symbol types are irregularly interspersed within the original data to be encoded or reconstructed.

It will of course be understood that instead of using one entropy encoder and multiple sets of metadata the system may instead utilise multiple entropy encoder modules for each type of symbol to be decoded. For example, the de-sparsification module may instruct a different module to perform an entropy decoding operation based on the type of symbol it expects next in the dataset.

Figure 25:
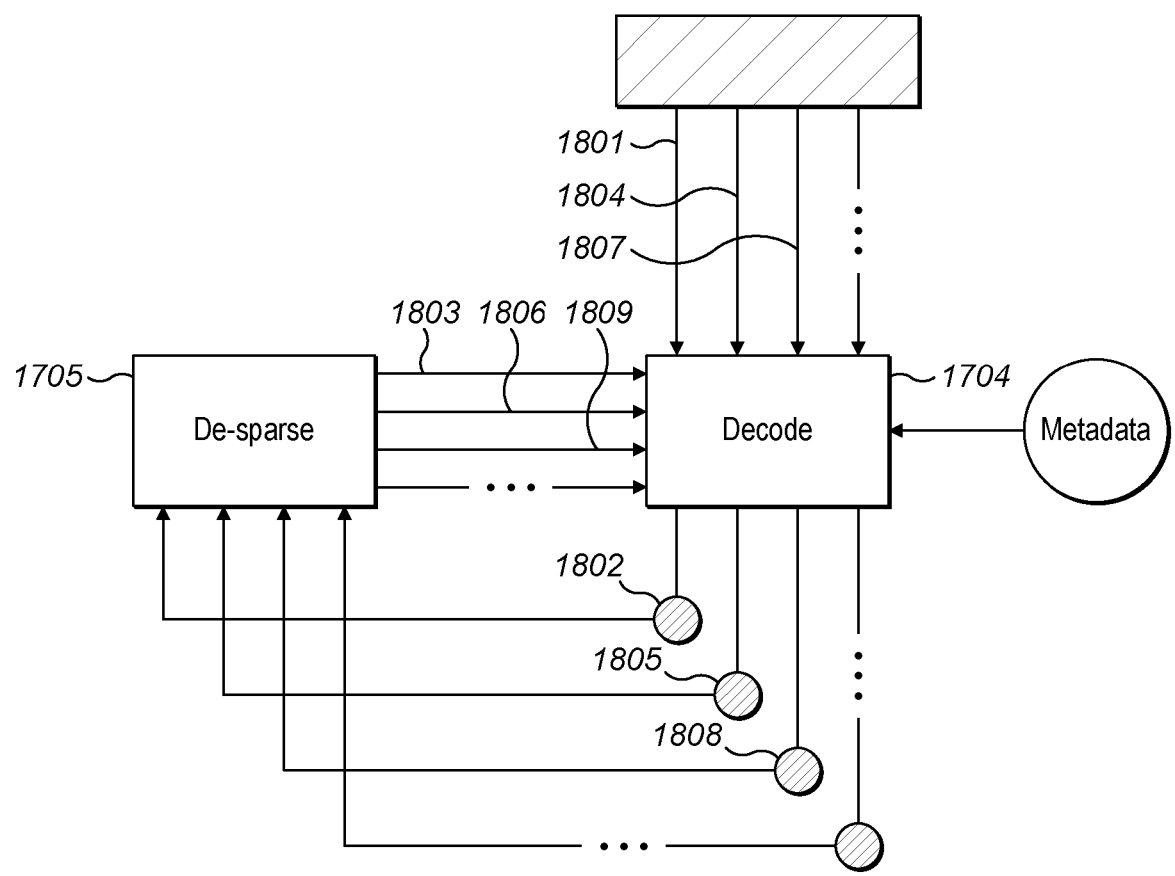
FIG. 25 illustrates an overview of coupled de-sparsification and decoding steps.

The process will now be described in detail in the context of FIG. 25. We start by assuming that the first symbol in the stream is of a first type. In the preferred example implementation it will be recalled from above the first type is a node symbol. In the implementation it is not relevant if the de-sparsification stage 1805 instructs the entropy decoding stage 1804 that the first symbol is of a first type of the entropy decoder inherently has a degree of intelligence or predetermination to identify the first expected type.

The entropy decoding stage will retrieve metadata from a store of metadata corresponding to the first symbol type. The metadata may include decoding parameters for example and may include an indication of probability. For example if the decoding operation is a range decoder, the metadata may include a probability distribution or cumulative distribution function.

After identifying the first symbol (step 1801), this is passed to the de-sparsification stage (step 1802). The first symbol is used by the de-sparsification stage to determine a type of symbol expected later in the stream.

In preferred implementations, the de-sparsification stage follows the process described above. That is, the de-sparsification stage assigns the received symbol to the root of a tree and analyses the bits of the symbol to traverse the tree. For example, if the symbol is [1000] as in the described example of FIG. 9a, then the tree is traversed and the de-sparsification stage will identify that the next symbol is to be a node symbol.

The de-sparsification stage returns to the entropy decoding stage the type of symbol to be expected next (step 1803). Based on this information, the entropy decoding stage is able to decode the next symbol from the data stream according to the metadata for the received type of symbol.

Following the example described above, the next symbol will be a node symbol and the entropy decoding stage, if a range decoder, can utilise the cumulative distribution function used for the previous node symbol (step 1804). Again, this is passed to the de-sparsification stage (step 1805). Following the example, the next symbol will be a node symbol which is entropy decoded using the same cumulative distribution function. Here, we have reached the stage of FIG. 11a. The tree has been built with three visited nodes. Following the example, the de-sparsification stage assumes the next Layer is not sent in the bytestream and now expects a data symbol.

The de-sparsification stage accordingly now signals to the entropy decoding module that the expected symbol is of a different, second, type (steps 1806). The entropy coding stage thus retrieves metadata for the second type of symbol. Again, if the entropy coding operation is a range coding operation then the store of metadata will include a second, respective, cumulative distribution function. The entropy coding operation thus retrieves the next symbol from the stream using this second set of parameters, i.e. this second cumulative distribution function (steps 1807, 1808).

Returning to the example of FIG. 12a, the next three symbols will of course be data symbols as in the example process all four sibling data symbols for a block are explicitly signalled. Thus, the de-sparsification stage will signal to the entropy decoding stage than the next three symbols are of the second type (step 1809). Of course as indicated above, there may be a degree of intelligence or predetermined expectation coded into the entropy decoding stage or module. For example, when it knows a data symbol is to be retrieved it may know to retrieve four. Depending on implementation, the entropy decoding stage may of course wait for an indication of the symbol type each time it tried to identify a symbol from the stream.

In the example, the process will continue according to the traversal of the tree. That is, in the example of FIGS. 14*a* to 19*a*, the next symbol expected will be a node symbol and the de-sparsification stage will instruct the decoder to use the first set of parameters or metadata to identify the next symbol.

Now that the process has been understood, it is recalled that rather than the entropy decoding stage switching between sets of metadata, there may instead be multiple entropy decoding modules, each using one set of metadata and each retrieving a symbol from the stream of interspersed symbols of different types according to which type of symbol is to be expected next.

It was described above that the entropy decoding stage may be any type of entropy decoding module. For example, the entropy decoding module may be a Huffman decoding module where the symbols in the stream are of a fixed length. Preferably however the entropy decoder is a range decoder. If multiple decoding modules are used, the first type of symbols may be decoded using a first type of entropy decoder and the second type of symbols may be decoded using a second type. For example, the fixed length nodes symbols may be decoded using a Huffman decoder and the data symbols may be decoded using an arithmetic decoder, which may be beneficial if the types of symbol are of differing lengths or is one type lends itself to a fixed length operation and the other to a variable length operation.

It will be clear to one skilled in the art how techniques described herein may be embodied within a system comprising an encoder and a decoder. At the decoder, the encoded data set may be retrieved from a data store or received from a streaming server. In such a further embodiment, one or more streaming server(s) may be connected to a plurality of client devices. At the streaming server, the encoder may receive and encode a video or image stream and deliver the stream (e.g. bytestream or bitstream used interchangeably) to the client devices. Thus the stream can be decoded by a decoder to recreate the information that has been comprised. Any suitable mechanism to deliver the stream may be used, such as unicast or multicast, as would be well-known to the skilled person.

Techniques described here may be suitable for the encoding, decoding and reconstruction of any dimension array of data. However, although the techniques are also applicable to linear data, they are most beneficial for image or video reconstruction. In the case of a picture or video, the data could be values associated with a colour space (e.g., the value of a red component in an RGB colour space, or the value of a Y component in a YUV colour space, etc.), or alternatively the data could be residual data (whether transformed or not) or metadata used to decode a bytestream or bitstream. Residuals are further defined in the present application, but in general residuals refer to a difference between a value of a reference array and an actual array of data. Thus, the techniques are most suitable for any plane of data.

It should be noted that techniques described in the above examples are agnostic as to the meaning or use of the decoded array. Of course, the data set may be used to reconstruct a larger dataset by combining multiple decoded data. Once recreated the data may represent any information which has been compressed, such as an image or sonogram. As will be understood from the following described examples, encoding and decoding techniques wherein a quantity of data to be compressed and transmitted or stored by way of a scheme involving encoding the data in a hierarchy of data structures from which the original data can be reconstructed are especially suitable for use with the invention.

At both the encoder and decoder, for example implemented in a streaming server or client device or client device decoding from a data store, methods and processes described herein can be embodied as code (e.g., software code) and/or data. The encoder and decoder may be implemented in hardware or software as is well-known in the art of data compression. For example, hardware acceleration using a specifically programed GPU or a specifically designed FPGA may provide certain efficiencies. For completeness, such code and data can be stored on one or more computer-readable media, which may include any device or medium that can store code and/or data for use by a computer system. When a computer system reads and executes the code and/or data stored on a computer-readable medium, the computer system performs the methods and processes embodied as data structures and code stored within the computer-readable storage medium. In certain embodiments, one or more of the steps of the methods and processes described herein can be performed by a processor (e.g., a processor of a computer system or data storage system).

Generally, any of the functionality described in this text or illustrated in the figures can be implemented using software, firmware (e.g., fixed logic circuitry), programmable or non-programmable hardware, or a combination of these implementations. The terms "component" or "function" as used herein generally represents software, firmware, hardware or a combination of these. For instance, in the case of a software implementation, the terms "component" or "function" may refer to program code that performs specified tasks when executed on a processing device or devices. The illustrated separation of components and functions into distinct units may reflect any actual or conceptual physical grouping and allocation of such software and/or hardware and tasks.

The invention claimed is:

1. A method of decoding a received set of encoded data representing information that comprises a plurality of data elements having values within a range of values and that has been compressed by way of entropy encoding, the method comprising:

receiving data comprising the set of encoded data and a set of banded distribution data, wherein the set of banded distribution data comprises a plurality of pairs of values, each pair comprising a sub-range value indicating a respective sub-range of the range of values and a probability value representing a probability of a data element of the plurality of data elements having a value within the respective sub-range, wherein the set of banded distribution data corresponds to a cumulative function, two or more of the sub-ranges are unequal in extent, and the sub-range value represents an upper bound of the respective sub-range, such that two or more of the sub-ranges have upper bounds that are separated from the upper bound of the immediately preceding sub-range by unequal elements;

and reconstructing the information that has been compressed, by way of performing entropy decoding, based upon a probability distribution defined by the set of banded distribution data, upon the set of encoded data.

2. A method according to claim 1, wherein the extent of each of two or more of the sub-ranges is inversely dependent upon the probability density in a region of the range of values corresponding to the respective sub-range.

3. A method according to claim 1, further comprising calculating the probability distribution from the set of banded distribution data.

4. A method according to claim 3, wherein calculating the probability distribution comprises transforming the banded distribution data into data representing a probability density function.

5. A method according to claim 3, wherein calculating the probability distribution includes applying a predetermined probability function to each sub-range of the banded distribution data.

6. A method according to claim 5, wherein the predetermined probability function is a rectangular function or a triangular function.

7. A method according to claim 1, further comprising, for at least one of the sub-ranges, calculating, based upon the set of banded distribution data, a plurality of frequency values each of which represents a count of data elements in the plurality of data elements that have a value equal to a respective value in the sub-range, so as to obtain a probability function for the encoded data.

8. A method according to claim 1, wherein the set of banded distribution data defines a Laplace distribution and comprises a pair of values characterizing the Laplace distribution of which the sub-range value corresponds to a location parameter .mu. and the probability value corresponds to a scale parameter b.

9. A method according to claim 1, wherein the data elements are tree node symbols defining a tree data structure.

10. A method according to claim 1, wherein the set of banded distribution data is received as metadata associated with the received set of encoded data.

11. A method according to claim 1, wherein the range of values is a first range of values, and wherein each of the plurality of data elements comprises a second value within a second range of values, and wherein the set of banded distribution data comprises one or more sets of three values, each set of three values comprising a first sub-range value indicating a respective sub-range of the first range of values, a second sub-range value indicating a respective sub-range of the second range of values, and a probability value representing a probability of a data element of the plurality of data elements having a first value within the respective sub-range of the first range and having a second value within the respective sub-range of the second range.

12. A method according to claim 1, wherein the set of banded distribution data comprises 15 pairs of sub-range and probability values, corresponding to 15 sub-ranges.

13. A decoder apparatus configured to execute the method of claim 1.

14. A computer-readable storage medium having stored thereon program code configured for executing the method of claim 1.

15. A method of compressing information comprising a plurality of data elements having values within a range of values so as to obtain a set of encoded data, the method comprising:
   obtaining probability distribution data comprising a plurality of probability values representing, for each of the range of values, a probability of a data element of the plurality of data elements having a value equal to the respective value;
   defining a plurality of sub-ranges of the range of values;
   calculating, for each of the sub-ranges, a probability value representing a probability of a data element of the plurality of data elements having a value within the respective sub-range, so as to obtain a set of banded distribution data comprising one or more pairs of values, each pair comprising a sub-range value indicating a respective sub-range of the range of values and a probability value for the respective sub-range, wherein the set of banded distribution data corresponds to a cumulative distribution function, two or more of the sub-ranges are unequal in extent and the sub-range value represents an upper bound of the respective sub-range, such that two or more of the sub-ranges have upper bounds that are separated from the upper bound of the immediately preceding sub-range by unequal extents;
   performing entropy encoding upon the plurality of data elements, based upon the set of banded distribution data, so as to obtain a set of encoded data; and
   sending or storing the set of encoded data and the banded distribution data such that the banded distribution data is associated with the set of encoded data.

16. A method according to claim 15, wherein defining the plurality of sub-ranges is performed such that the extent of each of two or more of the sub-ranges is inversely dependent upon the probability density in a region of the range of values corresponding to the respective sub-range.

17. A method according to claim 16, wherein defining the plurality of sub-ranges is performed such that, for regions of a given size within the range of values, the number of sub-ranges is greater within a region within which the probability of a data element of the plurality of data elements having a value within the region is greater, and is smaller within a region within which the probability of a data element of the plurality of data elements having a value within the region is lower.

18. A method according to claim 16, wherein defining the plurality of sub-ranges comprises:
   defining a plurality of initial sub-ranges of equal extent; and
   calculating adjustments to one or more bounds of the initial sub-ranges so as to obtain a set of adjusted bounds defining a plurality of sub-ranges, two or more of which being unequal in extent, thereby defining the plurality of sub-ranges.

19. A method according to claim 18, wherein the calculated adjustments comprise any of: altering the position within the range of a bound to an initial sub-range; removing a bound to an initial sub-range so as to combine two initial sub-ranges into a single sub-range; and inserting a bound so as to divide an initial sub-range into two sub-ranges.

20. A method according to claim 18, wherein calculating a probability value for each of the plurality of sub-ranges comprises, for each of sub-ranges, calculating a probability of a data element of the plurality of data elements having a value within the respective sub-range in accordance with a respective sub-set, corresponding to the values within the respective sub-range, of the probability values comprised by the probability distribution data.

21. A method according to claim 18, further comprising calculating, for each of the plurality of initial sub-ranges, an initial probability value representing a probability of a data element of the plurality of data elements having a value within the respective initial sub-range,
   wherein calculating the probability values for the sub-ranges is performed in accordance with the plurality of initial probability values.

22. A method according to claim 16, wherein defining the plurality of sub-ranges is performed by way of an iterative calculation and/or by way of dynamic programming.

23. A method according to claim 16, wherein the number of sub-ranges of the range of values that are defined is 15, such that the number of pairs of sub-range and probability values comprised by the banded probability data is 15.

24. An encoder apparatus configured to execute the method of claim 15.

25. A computer-readable storage medium having stored thereon program code configured for executing the method of claim 15.

* * * * *